United States Patent [19]
Marecki

[11] Patent Number: 5,674,605
[45] Date of Patent: Oct. 7, 1997

[54] RETROREFLECTIVE TRANSFER SHEET AND APPLIQUE

[75] Inventor: Paul E. Marecki, May Township, Washington County, Minn.

[73] Assignee: Minnesota Mining and Manufacturing Company, St. Paul, Minn.

[21] Appl. No.: 528,906

[22] Filed: Sep. 15, 1995

[51] Int. Cl.$^6$ .............................. G02B 5/128; G02B 5/12
[52] U.S. Cl. .................... 428/325; 428/913; 359/518; 359/519; 359/536; 359/538
[58] Field of Search ...................... 359/518, 519, 359/536, 538, 529; 428/325, 195, 204, 207, 913; 404/14

[56] References Cited

U.S. PATENT DOCUMENTS

| | | | |
|---|---|---|---|
| 3,362,843 | 1/1968 | Smith et al. | 117/72 |
| 3,700,305 | 10/1972 | Bingham | 350/105 |
| 3,758,192 | 9/1973 | Bingham | 350/105 |
| 3,806,397 | 4/1974 | Kukoff | 161/4 |
| 3,971,692 | 7/1976 | Anderson | 156/241 |
| 3,998,985 | 12/1976 | Kitaj | 427/386 |
| 4,102,562 | 7/1978 | Harper et al. | 350/105 |
| 4,192,576 | 3/1980 | Tung et al. | 350/105 |
| 4,228,061 | 10/1980 | Pleuddemann | 260/31.2 R |
| 4,248,761 | 2/1981 | Pleuddemann | 260/42 |
| 4,367,919 | 1/1983 | Tung et al. | 350/105 |
| 4,377,988 | 3/1983 | Tung et al. | 359/518 X |
| 4,392,901 | 7/1983 | Pernicano et al. | 156/155 |
| 4,564,556 | 1/1986 | Lang et al. | 428/325 |
| 4,605,461 | 8/1986 | Ogi | 156/233 |
| 4,609,587 | 9/1986 | Giordano et al. | 428/325 |
| 4,756,931 | 7/1988 | Giordano et al. | 427/163 |
| 4,758,469 | 7/1988 | Lange | 428/325 |
| 4,763,985 | 8/1988 | Bingham | 350/105 |
| 4,772,511 | 9/1988 | Wood et al. | 428/325 |
| 4,931,414 | 6/1990 | Wood et al. | 501/103 |
| 5,130,402 | 7/1992 | Akiyama et al. | 528/45 |
| 5,200,262 | 4/1993 | Li | 428/266 |
| 5,283,101 | 2/1994 | Li | 428/141 |
| 5,290,847 | 3/1994 | Yukimoto et al. | 524/506 |
| 5,344,705 | 9/1994 | Olsen | 428/323 |
| 5,378,520 | 1/1995 | Nagaoka et al. | 359/518 X |
| 5,474,827 | 12/1995 | Crandall et al. | 359/536 X |

FOREIGN PATENT DOCUMENTS

| | | | |
|---|---|---|---|
| 256643 | 2/1988 | European Pat. Off. | C08J 7/12 |
| 294936 | 12/1988 | European Pat. Off. | B41M 3/12 |
| 0 512 668 A2 | 11/1992 | European Pat. Off. | G02B 5/128 |
| 92/07990 | 5/1992 | WIPO | D06Q 1/12 |

OTHER PUBLICATIONS

J. A. Brydson, *Plastics Materials, Fifth Ed.*; Butterworths: London; pp. 75–85, 125–126 (1989).

K.L. Chopra, *Thin Film Phenomena*; McGraw Hill: New York; p. 750 (1969).

*Primary Examiner*—Daniel Zirker
*Attorney, Agent, or Firm*—Gary L. Griswold; Walter N. Kirn; Karl G. Hanson

[57] ABSTRACT

A retroreflective applique is provided that includes a layer of optical lens elements partially embedded in and protruding from a transfer adhesive layer prepared from ingredients comprising a vinyl plastisol and a substantially nonhydrolyzed aminosilane adhesion promoter; wherein the aminosilane adhesion promoter is used in an amount effective to produce an applique capable of:

(a) retaining at least about 60% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions five times; and (b) retaining at least about 40% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions twenty-five times.

20 Claims, 2 Drawing Sheets

Atlanta 1996

Fig. 4

RETROREFLECTIVE TRANSFER SHEET AND APPLIQUE

FIELD OF THE INVENTION

The present invention relates to retroreflective transfer sheets and graphic images produced therefrom, i.e., appliques.

BACKGROUND OF THE INVENTION

During the growth in popularity of decorative appliques on garments such as T-shirts or jackets, there has been a continuing desire for ways to make such appliques retroreflective. Retroreflective appliques have the ability to return a substantial portion of incident light in the direction from which the light originated. On an outer garment worn at night, such retroreflective appliques provide a bright return of light to oncoming motorists, thereby adding a safety feature, as well as increased decorative appeal, to the garments.

A retroreflective applique typically includes a layer of optical lens elements, a polymeric binder layer, and a specular reflective layer. The optical lens elements usually are transparent microspheres that are partially embedded in the polymeric binder layer such that a substantial portion of each microsphere protrudes from the polymeric binder layer. The specular reflective layer is disposed on the portion of the transparent microsphere that is embedded in the polymeric binder layer and typically comprises aluminum, silver, or a dielectric mirror. Light striking the front surface of the retroreflective applique passes through the transparent microspheres, is reflected by the specular reflective layer, and passes back through the transparent microspheres to travel back in the direction of the light source.

Several methods are known or have been proposed to provide such retroreflective appliques. One such method involves applying a layer of glass microspheres over a printed design; however, this layered product is stiff and unsuitable for conformable garments. Another method involves silk-screening a design onto a garment, and then while the design is still wet, cascading microspheres onto the design; however, such an approach is messy, usually provides a nonuniform deposit of microspheres, and is impractical for obtaining high reflective brightness. Yet another method involves mixing hemispherically specularly coated glass microspheres into ink and printing this onto the garment; however, this results in a reduced retroreflectance because the hemispherically coated microspheres are randomly oriented within an applied coating.

In addition to being conformable or drapable so they can be used on garments, retroreflective appliques should be able to withstand laundering conditions. Examples of launderable retroreflective appliques are disclosed in U.S. Pat. No. 4,763,985 (Bingham), U.S. Pat. No. 5,200,262 (Li), and U.S. Pat. No. 5,283,101 (Li). These appliques, however, are not imagewise printed appliques, nor are they prepared using compositions having a viscosity or volatility that are suitable for imagewise printing, especially by screen printing. Furthermore, retroreflective appliques having multicolored designs are particularly desirable. Examples of multicolored retroreflective appliques are disclosed in U.S. Pat. No. 4,102,562 (Harper et al.) and U.S. Pat. No. 5,344,705 (Olsen), and PCT Application No. WO 92/07990 (Olsen et al.). Retroreflective appliques that can be multicolored, conformable and drapable, and exhibit very little loss of retroreflective brightness after a significant number of washings, are extremely desirable.

U.S. Pat. No. 5,344,705 (Olsen) and PCT Application No. WO 92/07990 (Olsen et al.) disclose a retroreflective transfer sheet material comprising a base sheet; a continuous layer of transparent microspheres partially embedded in a heat-softenable layer on the base sheet; a two-part resin composition comprising a polyester and an isocyanate hardener printed on the microsphere layer in an imagewise pattern; a two-part resin composition comprising a polyurethane or a polyester, an isocyanate hardener, and reflective flakes printed directly on the microspheres or on the polyurethane-based resin; and a two-pan extender resin comprising a polyurethane or a polyester and an isocyanate hardener printed in an imagewise pattern. Before the extender resin is hardened, a powdered hot melt adhesive is applied to the wet image. This powdered hot melt adhesive must be fused into the extender resin through the application of heat. After the image dries, the powdered hot melt adhesive is removed from the nonimage areas. This transfer sheet material is used by laying it on a substrate, with the transfer layer against the substrate, adhering the transfer layer to the substrate, and then stripping the base sheet and heat-softenable layer away.

The resulting transferred applique shows good home wash durability; however, the image is stiff and hard. This attribute leads to cracking when the fabric having the applique thereon is washed or flexed. These cracks serve as erosion and abrasion sites For Further image and brightness degradation during wear and laundering. If appliques made with these systems are applied to a substrate fabric that stretches, the image will break or crack open, leaving islands of the now broken image that move with the stretched fabric. When the fabric is allowed to return to its rest position, the islands of image do not completely join to reform an uninterrupted image. The cracks between image pieces remain open and are sites where wash erosion and wear abrasion can start.

U.S. Pat. No. 4,102,562 (Harper et al.) discloses appliques that are softer and more flexible than the appliques of Olsen; however, they do not wash well. The Harper et al. transfer sheet comprises a base sheet; a continuous layer of transparent microspheres partially embedded in a heat-softenable layer on the base sheet; a specular reflective layer (typically, a dielectric mirror) deposited onto the exposed surfaces of the microspheres; and a thick transfer layer (typically, a color layer) of a vinyl plastisol ink printed over the microsphere layer in an imagewise pattern. An adhesion-promoting layer comprising a silane is coated on the microspheres prior to the vinyl plastisol ink being coated thereon. This adhesion-promoting layer includes either a glycidoxypropyltrimethoxysilane or a polyurethane and a silane having reactivity toward polyurethane. Although Harper et al. disclose that they believe the silane provides a chemical linkage between the vinyl plastisol ink and the glass beads, the applique does not retain its retroreflective brightness because the microspheres tend to fall off after only a few washings. In fact, Harper et al. disclose that after only five machine washings, the appliques on sample garments displayed a 60% loss in retroreflectivity.

Thus, what is needed is a retroreflective applique that is softer, more durable, and easier to manufacture than conventional retroreflective appliques and transfer sheets for applying such appliques to a substrate, such as an article of clothing, for example.

SUMMARY Of THE INVENTION

The present invention provides a retroreflective applique comprising: a layer of optical lens elements partially embedded in and protruding from a transfer adhesive layer prepared from ingredients comprising a vinyl plastisol and a substantially nonhydrolyzed aminosilane adhesion promoter. Thus, the vinyl plastisol and substantially nonhydrolyzed aminosilane adhesion promoter are the major reaction components, although other ingredients can be present. The aminosilane adhesion promoter is used in an amount effective to provide a retroreflective applique that is capable of retaining at least about 60% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions five times, and at least about 40% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions twenty-five times. To impart retroreflectivity, the optical lens elements can be coated with a specular reflective material on the surface embedded in the transfer adhesive layer. Alternatively, reflective flakes can be distributed throughout the transfer adhesive layer.

The present invention also provides a retroreflective applique transfer sheet comprising the retroreflective applique discussed above and a carrier comprising a layer of a heat-softenable material; wherein the layer of optical lens elements in the retroreflective applique is partially embedded in the heat-softenable material. Preferably, the transfer adhesive layer is disposed on the optical lens elements in an imagewise fashion.

The present invention also provides a kit for preparing a retroreflective applique comprising:
(a) a base sheet material comprising:
 (i) a carrier comprising a heat-resistant backing and a layer of a heat-softenable material coated thereon; and
 (ii) a layer of optical lens elements partially embedded in and protruding from the heat-softenable material;
(b) ingredients for preparation of a transfer adhesive composition comprising a vinyl plastisol and a substantially nonhydrolyed aminosilane.

The aminosilane adhesion promoter is used to prepare the transfer adhesive composition in an amount effective to provide a retroreflective applique that is capable of retaining at least about 60% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions five times, and at least about 40% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions twenty five times. The base sheet material of the kit can be a vapor coated sheet material comprising: a carrier comprising a heat-resistant backing and a layer of a heat-softenable material coated thereon; a layer of optical lens elements partially embedded in and protruding from the heat softenable material; and a specular reflective material coated on the surfaces of the optical lens elements protruding from the heat-softenable material. Alternatively, the kit can include reflective flakes for mixing with the transfer adhesive composition.

Also provided is a method for preparing a retroreflective applique; the method comprising:
(a) providing a base sheet material comprising:
 (i) a carrier comprising a heat-resistant backing and a layer of a heat-softenable material coated thereon; and
 (ii) a layer of optical lens elements partially embedded in and protruding from the heat-softenable material; and
(b) imagewise printing a transfer adhesive composition prepared from ingredients comprising a vinyl plastisol and a substantially nonhydrolyzed aminosilane adhesion promoter to form a retroreflective applique transfer sheet; wherein the aminosilane adhesion promoter is used in an amount effective to provide a retroreflective applique that is capable of:
 (i) retaining at least about 60% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions five times; and
 (ii) retaining at least about 40% of its initial retroreflectivity after being laminated to 65/35 polyester/cotton blend fabric (100 g/m$^2$) at about 174° C. and about 2.8 Kg/cm$^2$ pressure for about 20 seconds and subjected to home laundering conditions twenty five times.

DETAILED DESCRIPTION Of THE INVENTION

The present invention provides a retroreflective applique, transfer sheet bearing the retroreflective applique, an article, such as an article of clothing, bearing a transferred applique, and a method of preparing the retroreflective transfer sheet. The appliques of the present invention display substantial improvements over conventional appliques with respect to durability, flexibility, stretch, and types of substrates to which they can be applied. Particularly preferred embodiments of the present invention are: (a) capable of reproducing complex images without costly and complex "weeding" operations (that is, without having to remove imaging material not part of the imaged region); (b) very durable to home laundering conditions, as measured by retention of a large portion of its original retroreflective brightness after a large number of launderings; (c) very soft and flexible such that the transferred applique approaches and preferably takes on the drape and flexibility of the fabric itself, and (d) able to be used on truly stretchable fabrics such that the transferred applique stretches with the fabric in normal, intended use and, when stretched beyond its maximum limit, the applique forms cracks and pinholes that generally close on return of the fabric to its rest position.

The retroreflective appliques of the present invention include a layer of optical lens elements, such as glass microspheres, which are preferably coated with a specular reflective material, and a transfer adhesive comprising a vinyl plastisol. A plastisol comprises finely divided resin particles, such as polyvinyl chloride particles, dispersed in a compatible plasticizer. It typically does not include organic solvents. As used in this context, "compatible" means that the resin particles can coexist on the molecular scale with the plasticizer such that the resin particles and plasticizer form a stable association with each other. Typically, this means that the resin particles are capable of being substantially solubilized in the plasticizer at an elevated temperature. Preferably, the solubility parameter δ, which is an experimentally determined property (i.e., $[(L-RT)/(M/D)]^{1/2}$ wherein L is the latent heat of vaporization, R is the gas constant, T is the absolute temperature, M is molecule weight, and D is density), for the resin particles is within about two units ($MPa^{1/2}$) of the solubility parameter of the plasticizer. Further discussion of the solubility parameter can be found in J. A. Brydson, *Plastics Materials*, 5th edition, Butterworths, London, pages 75–84 and 125–126 (1989).

In the plastisols of the present invention, the resin particles typically have a particle size of about 0.5–150 micrometers. If the particle size of the resin particles is about 0.5–2 micrometers, it is typically considered a "dispersion" resin. If the particle size of the resin particles is about 10–150 micrometers, it is typically considered an "extender" ruin. A typical composition includes about 60–100 parts dispersion resin, about 0–40 parts extender resin, and about 30–100 parts plasticizer. Typically, the plastisol is in the form of a paste that gels when heated as a result of solvation of the resin particles by the plasticizer.

Typically, because plastisols are in the form of a paste, they are particularly desirable for application of thick layers, although it is desirable that they be of a consistency suitable for printing. Furthermore, they can be printed in organic solvent-free form and then gelled upon the application of heat for a short period of time. This gelled state results from partial dissolution of the particles in the plasticizer and partial coalescence of the particles to form a very weak image that is generally dry to the touch and can withstand mild rubbing without smearing. Once in the gelled state, the further application of heat during lamination causes the gelled plastisol to temporarily soften and flow and/or penetrate a substrate, such as a fabric. During this process the particles are further dissolved by the plasticizer, and upon cooling, they are fused into a hard rugged image.

A wide variety of vinyl plastisols can be used as the transfer adhesive in the retroreflective appliques and transfer sheets of the present invention. Homopolymer resin plastisols as well as copolymer resin plastisols can be used. Homopolymer resins comprise particles polymerized from a single monomer unit, such as vinyl chloride, whereas copolymer resins comprise particles polymerized from mixtures of monomers. A preferred class of resins are resins made from vinyl chloride monomers. Copolymers made from vinyl chloride and a monomer selected from the group consisting of vinyl acetate, maleic anhydride, maleic acid, a maleic acid ester, vinyl ether, acrylic acid, an acrylic acid ester, and mixtures thereof may also be used. Copolymers that include carboxylated monomer units tend to adhere more tightly to glass and metal surfaces; however, they are aim difficult to work with because they are very viscous. Thus, they do not print in an imagewise fashion easily and are therefore less desirable vinyl plastisols for use in the present invention. Furthermore, the improvement in wash durability obtained using copolymers that include carboxylated monomer units compared with appliques made with homopolymer plastisols, is much less than the improvement achieved by the present invention. Thus, a preferred class of vinyl resins are made from monomers selected from the group consisting of vinyl chloride, vinyl acetate, vinyl ether, and mixtures thereof. A particularly preferred class of vinyl resins are made from vinyl chloride and a monomer selected from the group consisting of vinyl acetate, vinyl ether, and mixtures thereof.

A wide variety of plasticizers suitable for use in the vinyl plastisols that can be used as transfer adhesives in the present invention include nonvolatile organic liquids. Typical classes of plasticizers that are compatible with vinyl particles include, but are not limited to, terephthalate esters, isophthalate esters, and ortophthalate esters, nonlimiting examples of which include butyl benzyl phthalate, dihexyl phthalate, di-2-ethylhexyl phthalate, diisooctyl phthalate, diisononyl phthaiate, and ditridecyl phthalate; adipates, nonlimiting examples of which include dioctyladipate, diisononyladipate, di-2-ethylhexyl adipate, and adipates of straight chain $C_6$–$C_{10}$ alcohols; azelates, nonlimiting examples of which include dioctylazelate and diisooctyl azelate; sebacates, nonlimiting examples of which include dioctyl sebacate; trimellitates, nonlimiting examples of which include trioctyl trimellitate and triisononyl trimeilitate; polymeric plasticizers with a molecular weight of about 1,000–10,000 resulting from the esterification of dibasic acids with glycols; phosphates, nonlimiting examples of which include tricresylphosphate, cresyldiphenylphosphate, and octyldiphenylphosphate; and epoxides, a nonlimiting example of which is epoxidized soybean oil. These materials may be used alone or in combination and are typically commercially available. For example, diisononyl phthaiate is commercially available under the trade designation "JAY-FLEX DINP" from Exxon Chemical Co., Houston, Tex.; di-2-ethylhexyl adipate is commercially available under the trade designation "PX-238" from Aristech Chemical Co., Pittsburgh, Pa.; trioctyl trimellitate is commercially available under the trade designation "PX-338" from Aristech Chemical; tricresylphosphate is commercially available under the trade designation "KRONITEX TCP" from FMC Corporation, Philadelphia Pa.; and epoxidized soybean oil is commercially available under the trade designation "PX-800" from Aristech Chemical.

Suitable vinyl plastisols can be prepared by combining at least one type of vinyl resin with at least one type of compatible plasticizer, as discussed above. Although the inventor does not wish to be held to any particular theory, the plasticizer tends to soften the vinyl resin and lower its processing temperature. Thus, vinyl plastisols can typically be fused at temperatures as low as about 150° C., which is desirable for application of the appliques of the present invention. Suitable plastisols are also commercially available.

A plastisol can also include additives such as heat stabilizers, fillers, colorants, volatile diluents, and the like. Heat stabilizers, such as Ba—Cd—Zn stabilizers available under the trade designations "S-1861" and "1528" from Synthetic Products Company, Cleveland, Ohio, and the like, aid in the prevention of polymer degradation caused by processing heat. If a heat stabilizer is used, it will typically be used in an amount of about 0.5–5 parts by weight, based on 100 parts vinyl resin. Surface active agents, such as those available under the trade designations "BYK 3105" and "BYK 4010" from Byk-Chemie, USA, Wallingford, Conn., and the like, can be included in the plastisol formula to adjust viscosity and to assist in keeping a desired viscosity stable over time. If a surface active agent is used, it will typically be used in an amount of about 0.1–3 parts by weight, based on 100 parts vinyl resin. Colorants, i.e., dyes or pigments, such as those available under the trade designations "81Y312," "81S284," and "81R278" from Penn Color Co., Doylestown, Pa., and the like, can be included to impart opacity, color, or weatherability properties. If a colorant is used, it will typically be used in an amount of about 0.5–5 parts by weight, based on 100 parts of vinyl resin. Fillers, such as chalks, clays, silica, and the like, may also be present in a plastisol formula to reduce cost, increase viscosity, or adjust electrical, tack, or scuff properties. If a filler is used, it will typically be used in an amount of up to about 50 parts by weight, based on 100 parts vinyl resin. Powdered or liquid adhesive enhancers can also be included to improve the adhesion of the image layer to its substrate. These can be of the hot melt powdered type such as polyamide or polyester hot melt adhesives, or they can be of the liquid resin type such as isocyanate resins, epoxy resins, or melamines. If a powdered or liquid adhesive enhancer is used, it will typically be used in an amount of about 0.5–5 parts by weight, based on 100 parts vinyl resin. Each of these types of additives provides some advantage for the specific application for which the plastisol is intended.

Examples of commercially available vinyl plastisols include those sold under the trade designations "PLUS 9090" from Union Ink Company, Inc., Ridgefield, N.J., "TRANSFLEX 10210TF" from flexible Products Company, Kennesaw, Ga., and "SX 864A," "SX 864B," "SX 864C," "SX 864D," "SX 874A," "SX 874B," and "SX 863," all of which are available from Plast-O-Meric SP, Inc., Sussex, Wis. All of these comprise vinyl particles uniformly dispersed in a plasticizer, such as an orthophthalate ester. Although these vinyl plastisols are colorless, similar ones are available that include colorants.

Typically, plastisols, particularly vinyl plastisols, do not adhere well to glass, metals, metal oxides or hydroxides, or dielectric metal complexes. Thus, the use of vinyl plastisols directly on coated glass microspheres, for example, in retroreflective appliques typically leads to poor wash durability. The present invention provides a method by which the adhesion of vinyl plastisols to coated glass microspheres is improved. This involves the incorporation of an aminosilane adhesion promoter in the plastisol and directly binding the plastisol to the optical lens elements, to their reflective coating, or to both. That is, there is no intervening binder layer, although there may be an intervening specular reflective material.

The retroreflective appliques and articles of clothing bearing them have been found to exhibit surprising retention of retroreflective brightness after being repeatedly laundered. This advantageous result is achieved through increased resistance to loss of retroreflective elements due to binding the vinyl plastisol to the optical lens elements. Consequently, articles bearing the retroreflective appliques of the present invention can be cleaned more times than previously thought possible while still retaining the desired retroreflective character.

When laminated to 65/35 polyester/cotton blend fabric (100 g/m$^2$) at about 174° C. and about 2.8 Kg/cm$^2$ pressure for about 20 seconds, retroreflective appliques of the present invention retain at least about 60%, preferably at least about 70%, more preferably at least about 80%, and most preferably at least about 90%, of their initial retroreflectivity after being subjected to home laundering conditions five times. Similarly, when laminated to 65/35 polyester/cotton blend fabric (100 g/m$^2$) at about 174° C. and about 2.8 Kg/cm$^2$ pressure for about 20 seconds, retroreflective appliques of the present invention retain at least about 40%, and preferably at least about 50%, of their initial retroreflectivity after being subjected to home laundering conditions twenty five times. As used herein, "initial retroreflectivity" refers to the retroreflective brightness of the laminated applique prior to laundering. As used herein, "home laundering conditions" refer to the procedure described in the Examples Section. Briefly, this includes washing each sample for five consecutive cycles in a Maytag Model LS7804 automatic washing machine ("Regular" fabric (setting 10); "Large" load; and "Hot/Cold" temperature using an initial water temperature of about 43° C.) with 40 grams of a standard detergent per wash cycle. After every fifth wash/rinse cycle, each sample is tumble-dried in a Maytag Model LS7804 dryer until the total load is dried (60° C. temperature and "Regular" fabric), and then tumbled for a 5–10 minute cooling period with the heat turned off.

The appliques of the present invention are also able to withstand dry cleaning operations. Vinyl plastisols are customarily not expected to withstand dry cleaning operations. The vinyl plastisol transfer adhesive compositions of the present invention are able to withstand at least about twenty five dry cleaning operations without appreciable loss of brightness. It is believed that this is due to the presence of the aminosilane adhesion promoter. This is an additional and unexpected benefit of the present invention.

The appliques of the present invention also demonstrate substantial flexibility and stretchiness. For example, when subjected to the stiffness test described below in the Examples Section, appliques of the present invention demonstrate significantly smaller bending moments (about ten times less) than do appliques made according to U.S. Pat. No. 5,344,705 (Olsen). Preferably, the appliques of the present invention have a maximum bending moment, as determined by Method 5205, federal Test Method Standard No. 191A, of less than about $1\times10^{-3}$N.m, and preferably less than about $8\times10^{-4}$N.m.

The appliques of the present invention are also more readily laminated to a substrate without damaging the applique upon removal of the carrier. That is, the carrier can be removed with a relatively small peel force while leaving the edges of the applique sharp.

Figure 1:
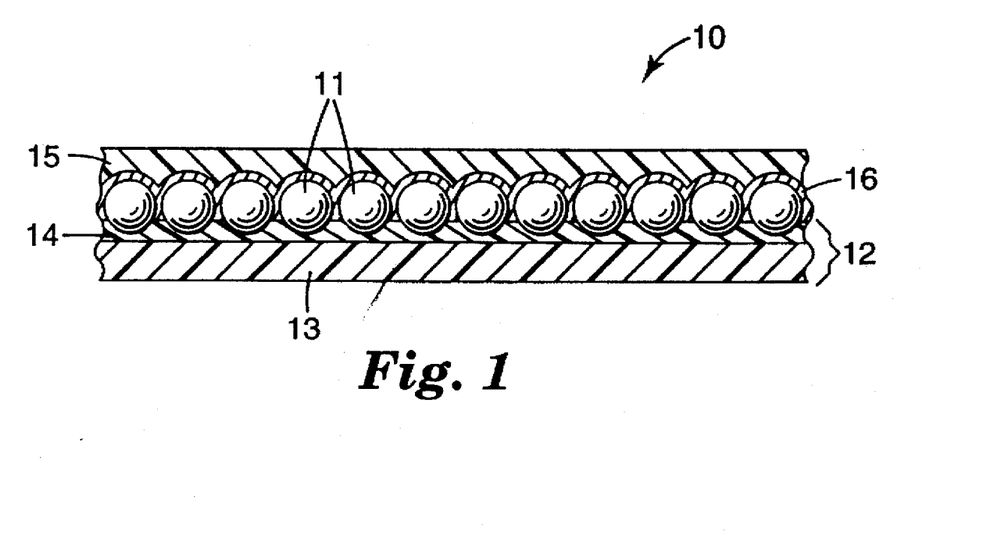
FIG. 1 is an enlarged sectional view through a portion of a retroreflective transfer sheet of the present invention having a layer of a transfer adhesive comprising a plastisol and an aminosilane adhesion promoter mixed therein.
Figure 2:
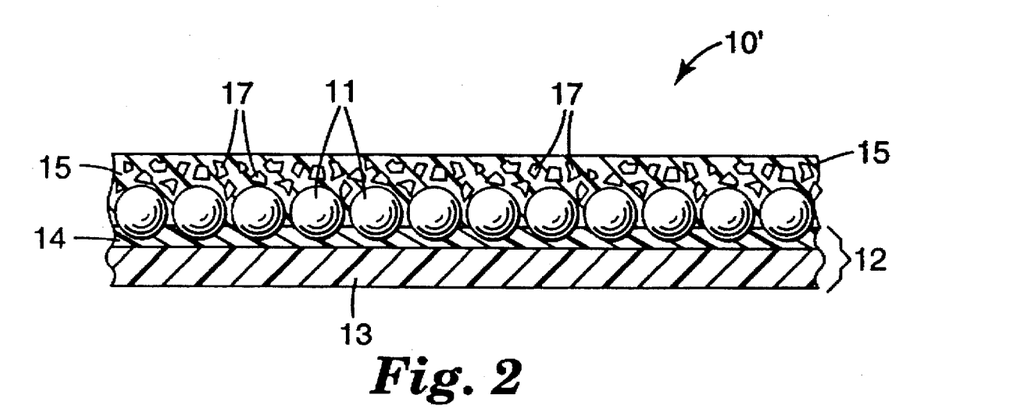
FIG. 2 is an enlarged sectional view through a portion of an alternative embodiment of the retroreflective transfer sheet shown in FIG. 1.

One embodiment of a retroreflective transfer sheet 10 according to the present invention is shown in FIG. 1. An alternative embodiment of a retroreflective transfer sheet 10" is shown in FIG. 2. These transfer sheets 10 and 10" each include a layer of optical lens elements in the form of microspheres 11 disposed on a carrier 12, which includes a heat-resistant backing 13 and a heat-softenable layer 14. The microspheres 11 are partially and releasably embedded in the heat-softenable layer 14. Herein, the backing 13 with the heat-softenable layer 14 and microspheres 11 is referred to as a "base sheet material." On the side of the base sheet material with the microspheres 11 is a layer of a transfer adhesive 15 comprising a plastisol.

This transfer sheet is used by laying it on a substrate, with the transfer adhesive layer against the substrate, adhering the transfer adhesive layer to the substrate through the application of heat, and then stripping the backing and heat-softenable layer away. This leaves the retroreflective applique adhered to the substrate. It includes a layer of optical lens elements partially embedded in and protruding from the transfer adhesive layer.

The backing 13 is preferably made of a material that does not melt or substantially degrade upon exposure to temperatures below about 210° C. Examples of suitable heat-resistant materials include polyethylene terephthalate and Kraft paper. Typically, polyethylene terephthalate is used when the optical lens elements are coated with a layer of aluminum and Kraft paper is used when the optical lens elements are coated with a layer of a dielectric material, although either backing material may be used with both types of coating on the optical lens elements. The heat-softenable layer 14 is firm and nontacky such that the optical elements can be easily removed from it during application of the applique. Preferably, it is made of a material that softens at a temperature of at least about 95° C. Examples of suitable heat-softenable materials include waxes, silicones, polyesters, polysulfones, polyvinyl chloride, and polyolefins such as low density polyethylene, polypropylene, polybutylene, and the like.

The optical lens elements are made of a material that is preferably substantially transparent so as to maximize the amount of incident light retroreflected. As used herein, "transparent" means capable of transmitting light. Preferably, the optical lens elements are made of a material that is capable of transmitting at least about 80% of the intensity of incident light in the visible spectrum (about 400–700 nanometer wavelength). More preferably, the optical lens elements are made of a material that is capable of transmitting about 90% of the intensity of light in the visible spectrum. The optical lens elements are typically made of glass, although nonvitreous ceramic compositions or synthetic resins can also be used. Glass and ceramic optical elements are preferred because they tend to be harder and more durable. Typically, the optical lens elements are substantially colorless, but they can be tinted or colored if desired.

The optical lens elements can be microspheres that are preferably substantially spherical in shape for substantially uniform and efficient retroreflection. Typically, microspheres suitable for use in the present invention have a diameter of about 30–200 micrometers, preferably about 60–100 micrometers, and more preferably about 40–90 micrometers. Microspheres smaller than about 30 micrometers in diameter tend to provide lower levels of retroreflection, and microspheres larger than about 200 micrometers tend to impart undesirable texture and/or flexibility. Preferably, the microspheres are substantially uniform in size, i.e., within about 25% in diameter. Preferably, these microspheres have an index of refraction of about 1.7–2.0. Examples of microspheres that can be used in the present invention are disclosed in, for example, U.S. Pat. No. 4,931,414 (Wood et al.); U.S. Pat. No. 4,772,511 (Wood et al.) ; U.S. Pat. No. 4,758,469 (Lange); U.S. Pat. No. 4,564,556 (Lang et al.); U.S. Pat. No. 4,367,919 (Tung et al.); and U.S. Pat. No. 4,192,576 (Tung et al.).

Referring to FIGS. 1 and 2, the microspheres 11 are packed in close proximity. Preferably, they are packed as closely as possible in their closest hexagonal arrangement, to achieve high retroreflective brightness. They are typically thermally embedded in the heat-softenable layer 14 to a depth of about 25–50%, preferably about 40–50%, of their diameter. This can he done by a variety of methods, such as by passing the carrier 12 and layer of microspheres 11 through a tunnel oven, for example, set at a temperature of about 95°–135° C.

The retroreflective properties of the applique of the present invention is provided in one of two general ways. Referring to FIG. 1, one such method includes the use of a layer of specular reflective material 16 such as a specular reflective metal or a dielectric mirror coated on the microspheres 11. Herein, the backing 13 with the heat-softenable layer 14 and microspheres 11 with the layer of specular reflective material 16 is referred to as a "vapor coated sheet material." In this embodiment, the specular reflective material is coated only on the surface of the microspheres that protrudes from the heat-softenable layer. Thus, when the applique is applied to a substrate, the rear surface of the microspheres (the surface embedded in the transfer adhesive layer) is coated with the specular reflective material.

Referring to FIG. 2, another method includes the use of reflective flakes 17 distributed throughout the transfer adhesive layer 15. Thus, in this embodiment, the microspheres are not coated with a specular reflective material and the base sheet material on which the transfer adhesive is coated (or imagewise printed) does not include any specular reflective material. Rather, the reflective material is mixed with the transfer adhesive prior to its application to the base sheet material. It should be understood, however, that reflective flakes can be used in combination with optical lens elements coated with dielectric layers.

Referring to FIG. 1, a variety of metals can be used to provide a specular reflective layer 16. These include aluminum, silver, chromium, gold, nickel, magnesium, and the like, in elemental form, and combinations thereof. In some instances, such as for aluminum, at least a portion of the metal can be in the form of a metal oxide and/or hydroxide. Aluminum and silver are the preferred metals for use in a reflective layer because they tend to provide the highest retroreflective brightness. Aluminum is more preferred because it generally provides better laundering durability when adhered to a glass optical element. The metal coating can he produced by vacuum or chemical deposition or electroless plating. The metal layer should be thick enough to reflect incoming light. Typically, the reflective metal layer is about 50–150 nanometers thick.

In lieu of, or in addition to, a reflective metal layer, a dielectric mirror can be used as a specular reflective material. The dielectric mirror can be similar to known dielectric mirrors disclosed, for example, in U.S. Pat. No. 3,700,305 (Bingham) and U.S. Pat. No. 4,763,985 (Bingham). Such minors include a number of layers of at least two different dielectric materials. When using a dielectric mirror, the optical lens elements typically have a refractive index $n_2$ and have one or more layers of transparent material disposed thereon that has a refractive index $n_1$, and the opposite face of the layer(s) of transparent material is in contact with a one or more layers of material having a refractive index $n_3$, where both $n_2$ and $n_3$ have a refractive index of at least 0.1, preferably at least 0.3, higher or lower than $n_1$. The layers of transparent material typically have an optical thickness corresponding to odd numbered multiples (1, 3, 5, 7 . . . ) of about one-quarter wavelength of light in the wavelength range of about 380–1,000 nanometers. Thus, either $n_2 > n_1 < n_3$ or $n_2 < n_1 > n_3$, and the materials on either side of the transparent layer(s) can be either both higher or both lower in refractive index than $n_1$. When $n_1$ is higher than both $n_2$ and $n_3$, $n_1$ is preferably about 1.7–4.9, and $n_2$ and $n_3$ are preferably about 1.2–1.7. Conversely, when $n_1$ is lower than both $n_2$ and $n_3$, $n_1$ is preferably about 1.2–1.7, and $n_2$ and $n_3$ are preferably about 1.7–4.9. The dielectric mirror preferably comprises a contiguous array of materials, at least one being in layer form, having an alternating sequence of refractive indices. In a preferred embodiment the contiguous array has 2–7 layers, preferably 3–5 layers, adjacent to the lens element. A dielectric mirror can provide very good retroreflectivity, although it typically is not as efficient a reflector as is a reflective metal layer, unless a very large number of layers are used. Furthermore, a dielectric mirror tends to wash away more readily than does a reflective metal layer; however, the wash durability of appliques made using a dielectric vapor coated sheet material is substantially improved over that without the aminosilane adhesion promoter.

Among the many compounds that can be used in providing and an aminosilane adhesion promoter in the transfer adhesive composition transparent materials within the desired refractive index are: high index materials such as CdS, $CeO_2$, CsI, GaAs, Ge, InAs, InP, InSb, $ZrO_2$, $Bi_2O_3$, ZnSe, ZnS, $WO_3$, PbS, PbSe, PbTe, RbI, Si, $Ta_2O_5$, Te, $TiO_2$; low index materials such as $Al_2O_3$, $AlF_3$, $CaF_2$, $CeF_3$, LiF, $MgF_2$, $Na_3AlF_6$, $ThOF_2$, elastomeric copolymers of perfluoropropylene and vinylidene fluoride, and the like. Other materials are reported in *Thin Film Phenomena*, K. L. Chopra, page 750, McGraw-Hill Book Company, New York, N.Y. (1969). A preferred dielectric mirror contains succeeding layers of cryolite ($Na_3AlF_6$) and zinc sulfide.

Another method for making the appliques of the present invention retroreflective includes the use of reflective flakes distributed throughout the transfer adhesive layer. Referring to FIG. 2, reflective flakes 17 are shown in a transfer adhesive layer 15 (not shown to scale). The reflective flakes are preferably metal flakes such as aluminum, bronze, or gold flakes, or nacreous pigment particles such as pearlescent pigments as disclosed in U.S. Pat. No. 3,758,192 (Bingham). The reflective flakes are microscopic in size. Because the reflective flakes are so much smaller than the microspheres, they can generally conform to the surfaces of the microspheres. Preferably, the reflective flakes are ellipsoidal in shape rather than rectangular. A suitable aluminum flake paste is available under the trade designation "MIRAL" 80,000/A/cx/70-30 from A. Van Lerberghe, Elleboogstraat 7, 8500 Kortrijk, Belgium. Several other aluminum pastes and powders are quite suitable, including, for example, those available under the trade designations "SUPER FINE P" and "ETERNABRITE 601-1" from Silberline Manufacturing Co., Inc., Tamaqua, Pa., and "CHROMAL X," "PCR 212," "PCA 501," from Obron Atlantic, Painesville, Ohio.

Referring to FIG. 1, the surfaces of the microspheres protruding from the heat-softenable layer 14 have a transfer adhesive layer 15 disposed thereon to form a retroreflective applique. As discussed above, this transfer adhesive layer comprises a vinyl plastisol. The transfer adhesive layer 15 is of a sufficient thickness to bond to the microspheres and to a substrate, without unnecessarily stiffening the applique. Thus, the thickness can vary depending on the diameter of the microspheres and the type of substrate. For example, when the sheet 10 is intended to be used in transferring a design to a fabric substrate, there should be enough material in the transfer adhesive layer 15 to penetrate the fabric and thereby attach the transferred adhesive to the fabric. Typically, the transfer adhesive layer 15 has a thickness of about 1–250 micrometers, preferably about 50–150 micrometers.

If the retroreflective applique is in the form of a specific image, the transfer adhesive layer is typically formed by "printing" (such as screen printing) an adhesive composition in an imagewise pattern. Thus, only a portion of the layer of optical lens elements would be covered by the transfer adhesive layer. The term "printing" or "printed" is used herein to include a variety of specific imaging processes, applied by hand, machine, or common mechanical or electronic methods, including spraying, printing, lithographing, screen printing, hand painting, or other suitable application processes. The adhesive composition can be printed directly onto the layer of optical elements, or alternatively directly onto the reflective layer coated on the optical elements. In these embodiments there is no primer layer used.

Referring to FIGS. 1 and 2, if a layer of a transfer adhesive composition containing only a vinyl plastisol is directly applied to the optical elements, or to the reflective layer coated on the optical elements, and the applique is laminated to fabric, the retroreflective brightness of the applique is greatly reduced upon washing the fabric, typically by the tenth wash. Typically, after the tenth wash according to the procedure described in the Examples Section, less than about 25% of the initial brightness is retained. This is because vinyl plastisols do not adhere well to glass, metals, metal oxides or hydroxides, or metal complexes used in dielectric materials. An exception to this are the carboxylated vinyl plastisols; however, they are generally too viscous to use in imagewise printing operations.

The aminosilane adhesion promoter includes amine functional groups that interact with the vinyl resin in the plastisol and with the optical lens elements or their reflective coating or both. Although other functional groups can be present, the organosilane includes at least one amine group per molecule. Thus, aminefunctional silanes (also referred to herein as "aminosilanes"), such as primary aminoalkyl silanes, secondary aminoalkyl silanes, and bis-silylalkyl amines, are particularly suitable for use with vinyl plastisols. In contrast, silanes such as γ-glycidoxypropyltrimethoxysilane, γ-mercaptopropyltrimethoxysilane, and γ-isocyanatopropyltrimethoxysilane, which are commercially available under the trade designations "A-187," "A-189," and "A-1310," respectively, from OSi Specialties, Inc., Lisle, Ill., generally provide no improvement in home wash durability when compared to samples containing no aminosilane adhesion promoter at the time of mixing with the plastisol. For effective adhesion, the aminosilanes are substantially nonhydrolyzed. By this it is meant, that typically less than about 5% by weight (wt-%) of the material is hydrolyzed. An example of a substantially hydrolyzed aminosilane is available under the trade designation "A-1106" from Osi Specialities, Inc. Use of substantially nonhydrolyzed aminosilanes promotes intermolecular interactions, such as with the optical lens elements, their specular reflective coatings, and with the vinyl plastisol, whereas aminosilanes hydrolyzed prior to mixing with the plastisol typically favor self interaction. Commercially available nonhydrolyzod aminosilanes include those available under the trade designations "A-1100" (γ-aminopropyltriethoxysilane), "A-1120" (N-β-(aminoethyl)-γ-aminopropyltrimethoxysilane), "A-1130" (the triaminofunctional silane $H_2NCH_2CH_2NHCH_2CH_2NHCH_2CH_2CH_2Si(OCH_3)_3$), and "A-1170" (bis-trimethoxysilylpropyl amine), all of which are available from OSi Specialties, Inc., Lisle, Ill. Other amine-functional alkoxysilanes, such as the analogous methoxy or ethoxy silanes, are commercially available and suitable for use in the present invention.

The amount of aminosilane adhesion promoter used varies depending on the combination of aminosilane and vinyl plastisol and the desired level of wash durability, as measured by the retention of the initial, unwashed retroreflective brightness of an applique applied to a substrate. Typically, the amount of aminosilane adhesion promoter used is preferably at least about 1 wt-%, based on the total weight of the transfer adhesive composition, although higher amounts are required for certain aminosilanes. For example, for certain combinations of aminosilanes and vinyl plastisols, desirable durability is not obtained until about 9 wt-% of the aminosilane is present in the transfer adhesive composition. For other aminosilanes, desirable durability is obtained with as little as 1–2 wt-%, and no further improvement is seen above about 7 wt-%. For other aminosilanes, low concentrations as well as high concentrations of aminosilane produce undesirable levels of wash durability. Furthermore, for carboxylated vinyl plastisols, for example, an amount of an aminosilane is required that is in excess of that which will react with all the carboxyl groups. Typically, however, for most combinations of aminosilanes and vinyl plastisols, desirable durability can be obtained with less than about 10 wt-% aminosilane. The desired amount of aminosilane can be readily determined by one of skill in the art with a minimal amount of routine experimentation.

The vinyl plastisol transfer adhesive composition is usually printed in a reverse image on a layer of optical lens elements, which protrude from a layer of heat-softenable material on a carrier, so that a positive image is formed when the applique is transferred to a substrate. A single printing step is used to apply the plastisol transfer adhesive composition. After the plastisol transfer adhesive composition is printed on the optical lens elements, it is dried, typically in an oven, preferably in a tunnel oven, so that the temperature of the entire thickness of the film making up the image reaches at least about 80°–120° C. The resulting dried material is in a "gel" state and has sufficient internal cohesion so it can be handled without damage. It is, however, only partially progressed toward its final fused state, which occurs during the application of the applique to the substrate. During lamination of the applique to the substrate, temperatures of about 150°–190° C. are used for about 5–30 seconds.

The appliques applied to articles of clothing, for example, using the transfer sheets of the present invention are improved over conventional retroreflective appliques because they are easier to manufacture, they are more flexible and stretchable, and they demonstrate improved wash durability. For example, the use of a plastisol transfer adhesive eliminates the use of cumbersome and messy powdered transfer adhesives, which are hard to control, difficult to clean up, and may be physical irritants to the operators. Elimination of the powdered transfer adhesive also eliminates the processing step of brushing the extraneous powder from nonimaged areas the day after printing, and also eliminates the processing step of melting the powdered transfer adhesive left in the imaged areas of the newly brushed transfers. Use of the plastisol transfer adhesive also eliminates the storage equipment and space, as well as labor required to store the imaged appliques made by conventional processes overnight before being able to proceed. When properly made and applied to fabric, transfer images made with conventional processes require at least 24 hours from the time of printing to the production of completed appliques applied to the substrate. By contrast, when properly made and applied, appliques of the present invention require approximately three minutes from the time of printing to the production of a completed applique applied to its substrate. Elimination of processing steps such as these that are required by conventional technology represents considerable savings of time, expense, labor, and equipment.

Furthermore, the use of a vinyl plastisol transfer adhesive provides a more flexible applique and a more wash durable applique. The elimination of solvent-borne materials, such as solvent-borne inks, eliminates the need for a two-step printing process, eliminates the problems associated with applying images in exact register, eliminates the problems associated with the safety, handling, and proper disposal of materials containing volatile organic compounds, and provides further improvement in the flexibility and wash durability of the applique. These appliques are extremely flexible and stretchable such that they can be used on LYCRA and other stretchable fabrics. Even if the applique is stretched beyond its maximum it will crack or break; however, if it is allowed to return to its rest position the cracks close and a whole image is formed again.

As stated above, in addition to the aminosilane adhesion promoter, metal flakes can be included within the transfer adhesive layer. Furthermore, colorants, such as pigments and dyes, can be included within the transfer adhesive layer. It will be understood by one of skill in the art that a wide variety of multicolored appliques can be prepared using only a single layer of the plastisol transfer adhesive described herein. For example, the multilayered appliques described in U.S. Pat. No. 5,344,705 (Olsen) can be prepared using a single layer of the plastisol transfer adhesive described herein. The adhesive layer can be formed by successively printing (typically screen printing in an imagewise pattern) and drying a plurality of colorant adhesive compositions onto the microspheres. In other words, the transfer adhesive layer can include a number of different colors, one for each colored segment of a multicolored design. Alternatively, segments can include a number of different colors mixed together to form a "hybrid" color in a single layer. Each colored area of the image is formed by a separately printed and gelled adhesive composition. In either case, the number of different colors or the "hybrid" color comprise different areas of the image that do not need to overlap and therefore are all on the same layer. All of these areas being thermoplastic, no imagewise second layer of transfer adhesive need be applied over the entire image as described in U.S. Pat. No. 5,344,705 (Olsen). This eliminates the need to print two overlapping layers of different colors to achieve "hybrid" colors. For example, if a sheet material of the invention includes an image printed with a transfer adhesive composition of the invention made by mixing together transfer adhesive compositions of yellow and cyan, the resulting single layer of the image will be green.

Other additives such as fillers, thermal stabilizers, light stabilizers, antioxidants, flame retardants, flow modifiers, plasticizers, and elastomers can be included in the adhesive transfer layer and/or the binder layer. The selection of any of these additives is determined by a number of processing and durability factors; however, laundering durability is a particularly important factor.

The appliques of the present invention can be transferred to a fabric or other substrate by heat and pressure. The appliques can be applied to a variety of fabrics such as cotton, polyester, cotton/polyester blends, fabrics containing "LYCRA" fibers, as well as fire retardant fabrics such as "PBI/KEVLAR" and "NOMEX" fabrics. The appliques of the present invention can also be applied to vinyl surfaces and other plastic-like materials, such as the side of a truck, mud flaps, and protective clothing, for example. They can be applied to an article of clothing directly or transferred to a fabric substrate, for example, and the fabric sewn onto the article of clothing if desired.

Figure 3:
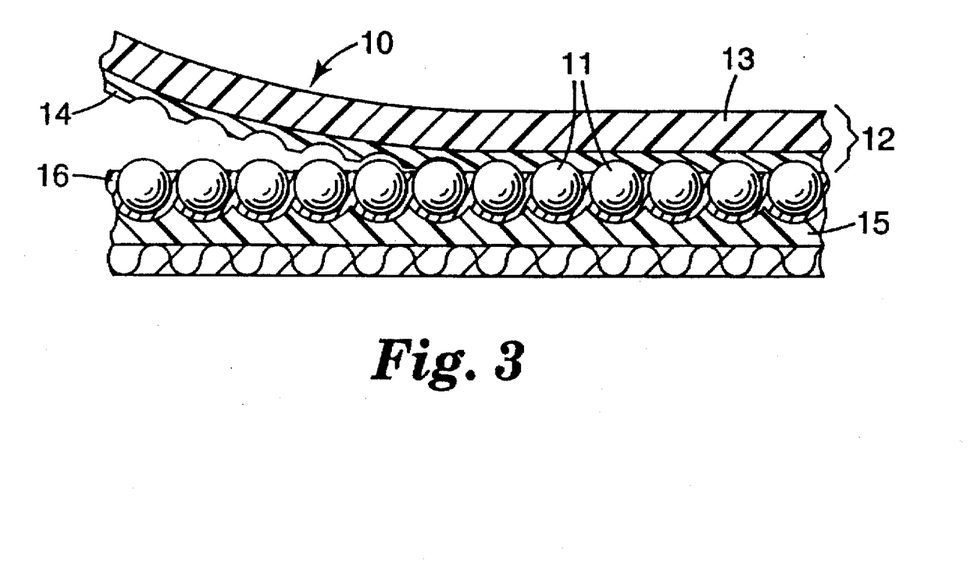
FIG. 3 illustrates schematically in a sectional view removal of the carrier from the transfer sheet shown in FIG. 1 after having been laminated to a substrate.
Figure 4:
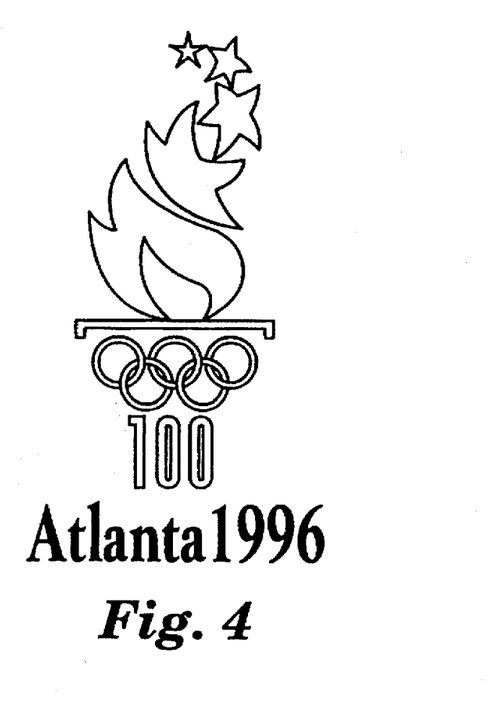
FIG. 4 is a top plan view of an illustrative emblem transferred onto a substrate according to the present invention.

In a typical application, a transfer sheet is placed so that the image is facing and in contact with the chosen substrate, and then placed in a thermal lamination device. Typical lamination conditions include a temperature of about 150°–190° C., a pressure of about 0.7–4.2 $Kg/cm^2$, and a time of about 5–30 seconds. After this, the construction is allowed to cool to room temperature and the carrier material is removed from the applique as shown in FIG. 3.

Although the retroreflective sheet of the present invention preferably includes imagewise printed appliques, it can also be in the form of roll goods that do not have specific images thereon. The same components that are used in an imagewise manner to form retroreflective images can be coated, by knife coater or other coating means, on a carrier to produce retroreflective roll goods.

The present invention also provides a kit that can be used for preparing the retroreflective applique transfer sheets of the present invention. A typical kit includes a base sheet material (e.g., a carrier with a backing and a heat-softenable material coated thereon with optical lens elements embedded in the heat-softenable material), and a transfer adhesive composition (e.g., a vinyl chloride plastisol and an aminosilane adhesion promoter, which are supplied in separate containers such that they can be mixed immediately prior to application to the base sheet material). The retroreflective properties of the applique can be supplied either in the form of a coating on the optical lens elements or as a separate container of reflective flakes for mixing with the transfer adhesive composition.

Advantages and other properties and details of this invention are further illustrated in the following examples. It is to be expressly understood, however, that while the examples serve this purpose, the particular ingredients and amounts used and other conditions are not to be construed in a manner that would unduly limit the scope of this invention. The examples selected for disclosure herein are merely illustrative of how to make preferred embodiments of the invention and how the preferred embodiments generally perform.

EXAMPLES

Retroreflective Brightness Test

The coefficient of retroreflection $R_A$, reported in candelas per lux per square meter ($cd/lux/m^2$), was measured using standardized test ASTM E 810-93b (1993). The entrance angle used in ASTM E 810-93b was $-4°$ and the observation angle was $0.2°$.

Home Wash Laundering Durability Test

Fabrics having the samples laminated thereto were subjected to a series of home laundering tests wherein each sample was subjected to the number of wash cycles stated in the tables. Each sample was washed for five consecutive cycles in a Maytag Model LS7804 automatic washing machine using the following settings: "Regular" fabric (setting 10); "Large" load; and "Hot/Cold" temperature. The washing machine was attached to a temperature-controlled water supply providing an initial water temperature of about 43° C. Forty grams of a standard detergent, obtained from the American Association of Textile Chemists and Colorists (AATCC) Technical Center, P.O. Box 12215, Research Triangle, N.C. 27709, were used for each wash cycle. After every fifth wash/rinse cycle, each sample was tumble-dried in a Maytag Model LS7804 dryer until the total load was dried using the following settings: 60° C. temperature; and "Regular" fabric. Each sample was then tumbled for a 5-10 minute cooling period in the dryer with the heat turned off. After each drying cycle, each sample was tested for retroreflective performance in accordance with ASTM E 810-93b.

Examples 1–39 and Comparative Examples A-BN

To the quantity of the selected vinyl type plastisol shown in Table 1 was added the stated quantity of the stated aminofunctional shane and the resulting mixture was stirred until homogeneous. The mixture was printed through a 110 T mesh/inch (43 T mesh/cm) polyester monofilament printing screen directly onto vapor coated sheet material (consisting of a polyester film backing covered with a heat-softenable layer of low density polyethylene having microspheres embedded therein to about 30–40% of their diameters and coated with aluminum metal), which is commercially available from 3M Co. Personal Safety Products, St. Paul, Minn., under the trade designation "SCOTCHLITE" Reflective Graphic film. Immediately after printing, the printed vapor coated sheet material was heated in a "TEXAIR" Model 30 tunnel oven (available from American Screen Printing Equipment Co., Chicago, Ill.) with infrared panel set to 594° C., forced air thermostat set to the off position, and belt speed set to allow 28–44 seconds total internal residence time, to cause gelation of the image. When the transfer sheet returned to room temperature it was placed with the applique against a 65/35 polyester/cotton blend fabric (100 $g/m^2$ and the applique was laminated with a Hix Model N-800 heat lamination press (available from Hix Corp., Pittsburg, Kans.) set to operate at about 174° C. For about 20 seconds. The air pressure in the air line feeding the heat lamination press was set at about 2.8 $Kg/cm^2$, which also represented the pressure at the platen. After heat lamination, the construction was allowed to return to room temperature and then the carrier (backing and heat-softenable material) was removed from the construction leaving the retroreflective applique attached to the fabric substrate. The fabric bearing the substrate was laundered according to the instructions described above. Retroreflective brightness was measured according to ASTM E 810-93b as a function of number of home launderings. The results are shown in Table 1. The compositions within the scope of the present invention (Examples 1–39) displayed desirable levels of retained brightness (at least about 60% after five washes, and at least about 40% after twenty-five washes). Data for similar constructions that did not contain an aminosilane (listed as 0% shane) or did not contain a sufficient amount of the aminosilane are also shown in Table 1 (Comparative Examples A-BN) and illustrate the importance of this component to the performance properties of the finished image. All data in Table 1 is the average of three separate measurements.

TABLE 1

| Example | Plastisol | Mass of Plastisol (grams) | Silane | Mass of Silane (grams) | Percent Silane | | Brightness After Home Washing — Number of Washings | | | | | | | |
|---|---|---|---|---|---|---|---|---|---|---|---|---|---|---|
| | | | | | | | 5 | 10 | 15 | 20 | 25 | 35 | 45 | 55 |
| Comp. A | SX 874A | | none | none | 0 | mean: | 296 | 102 | 33 | 10 | | | | |
| | | | | | | % initial: | 56% | 19% | 6% | 2% | | | | |
| Comp. B | SX 874A | 38.7 | A-187 | 0.43 | 1 | mean: | 339 | 185 | 84 | 35 | 11 | | | |

TABLE 1-continued

Brightness After Home Washing

| Example | Plastisol | Mass of Plastisol (grams) | Silane | Mass of Silane (grams) | Percent Silane | | Number of Washings | | | | | | | |
|---|---|---|---|---|---|---|---|---|---|---|---|---|---|---|
| | | | | | | | 5 | 10 | 15 | 20 | 25 | 35 | 45 | 55 |
| Comp. C | SX 874A | 25.8 | A-187 | 0.53 | 2 | mean: | 322 | 157 | 59 | 23 | 8 | | | |
| | | | | | | % initial: | 61% | 34% | 15% | 6% | 2% | | | |
| Comp. D | SX 874A | 32.4 | A-187 | 1.69 | 5 | mean: | 319 | 166 | 82 | 35 | 25 | | | |
| | | | | | | % initial: | 58% | 29% | 11% | 4% | 1% | | | |
| Comp. E[a] | SX 874A | 26.6 | A-1120 | 0.26 | 1 | mean: | 90 | 5 | | | | | | |
| | | | | | | % initial: | 57% | 30% | 15% | 6% | 4% | | | |
| Comp. F[a] | SX 874A | 27.8 | A-1120 | 0.56 | 2 | mean: | 139 | 20 | | | | | | |
| | | | | | | % initial: | 18% | 0% | | | | | | |
| 1[a] | SX 874A | 22.8 | A-1120 | 1.18 | 5 | mean: | 515 | 476 | 442 | 421 | 408 | | | |
| | | | | | | % initial: | 26% | 4% | | | | | | |
| Comp. G | SX 874A | 23.1 | A-187 | 0.48 | 2 | mean: | 97 | 46 | 17 | | | | | |
| | | | A-1120 | 0.47 | 2 | % initial: | 94% | 87% | 81% | 77% | 74% | | | |
| Comp. H | 10210TF | | none | none | 0 | mean: | 147 | 49 | 26 | 20 | | | | |
| | | | | | | % initial: | 18% | 9% | 3% | | | | | |
| Comp. I | 10210TF | 30 | none | none | 0 | mean: | 43 | 8 | | | | | | |
| | | | | | | % initial: | 27% | 9% | 5% | 4% | | | | |
| Comp. J | 10210TF | 21 | A-187 | 0.23 | 1 | mean | 223 | 119 | 63 | 35 | 28 | | | |
| | | | | | | % initial: | 8% | 1% | | | | | | |
| Comp. K | 10210TF | 25.5 | A-187 | 0.53 | 2 | mean: | 308 | 190 | 115 | 78 | 54 | | | |
| | | | | | | % initial: | 41% | 22% | 12% | 7% | 5% | | | |
| Comp. L | 10210TF | 23.6 | A-187 | 1.17 | 5 | mean: | 371 | 297 | 237 | 189 | 150 | | | |
| | | | | | | % initial: | 57% | 35% | 21% | 15% | 10% | | | |
| Comp. M | 10210TF | 30 | A-1120 | 0.32 | 1 | mean: | 341 | 221 | 149 | 93 | 57 | | | |
| | | | | | | % initial: | 69% | 55% | 44% | 35% | 28% | | | |
| 2 | 10210TF | 30 | A-1120 | 0.92 | 3 | mean | 561 | 545 | 531 | 513 | 487 | 445 | 413 | 382 |
| | | | | | | % initial: | 63% | 41% | 27% | 17% | 11% | | | |
| 3 | 10210TF | 50 | A-1120 | 2.25 | 4.85 | mean: | 550 | 537 | 528 | 517 | 509 | 475 | 447 | 433 |
| | | | | | | % initial: | 100% | 97% | 95% | 91% | 87% | 79% | 74% | 68% |
| 4 | 10210TF | 25.4 | A-187 | 0.51 | 2 | mean: | 556 | 542 | 523 | 504 | 489 | | | |
| | | | A-1120 | 0.53 | 2 | % initial: | 98% | 96% | 94% | 92% | 91% | 85% | 80% | 77% |
| Comp. N | 10210TF | 30 | A-1100 | 0.3 | 1 | mean: | 264 | 125 | 51 | 43 | | | | |
| | | | | | | % initial: | 99% | 96% | 93% | 89% | 87% | | | |
| 5 | 10210TF | 30 | A-1100 | 0.9 | 2.9 | mean: | 524 | 465 | 419 | 390 | 346 | 272 | 211 | 173 |
| | | | | | | % initial: | 47% | 22% | 9% | 8% | | | | |
| 6 | 10210TF | 30 | A-1100 | 1.5 | 4.75 | mean: | 561 | 532 | 509 | 490 | 464 | 414 | 379 | 353 |
| | | | | | | % initial: | 93% | 83% | 74% | 69% | 61% | 48% | 37% | 31% |
| Comp. O | 10210TF | 50 | A-1130 | 1.54 | 3 | mean: | 176 | 50 | 20 | | | | | |
| | | | | | | % initial: | 99% | 94% | 90% | 87% | 82% | 73% | 67% | 62% |
| Comp. P | 10210TF | 50 | A-1130 | 2.53 | 4.82 | Mean: | 356 | 193 | 107 | 64 | 47 | 34 | | |
| | | | | | | % initial: | 32% | 9% | 4% | | | | | |
| Comp. Q | 10210TF | 50 | A-1170 | 0.54 | 1.1 | mean: | 92 | 13 | 5 | | | | | |
| | | | | | | % initial: | 63% | 34% | 19% | 11% | 8% | 6% | | |
| 7 | 10210TF | 50 | A-1170 | 1.5 | 2.9 | mean: | 532 | 458 | 405 | 359 | 316 | 206 | 132 | 88 |
| | | | | | | % initial: | 16% | 2% | 0% | | | | | |
| 8 | 10210TF | 50 | A-1170 | 2.51 | 4.8 | mean: | 540 | 513 | 490 | 466 | 430 | 378 | 322 | 284 |
| | | | | | | % initial: | 93% | 80% | 71% | 63% | 55% | 36% | 23% | 15% |
| Comp. R | 10210TF | 50 | A-1106 | 0.5 | 1 | mean: | 25 | 7 | | | | | | |
| | | | | | | % initial: | 97% | 92% | 88% | 83% | 77% | 68% | 58% | 51% |
| Comp. S | 10210TF | 50 | A-1106 | 1.54 | 3 | mean: | 82 | 18 | 8 | | | | | |
| | | | | | | % initial: | 4% | 1% | | | | | | |
| Comp. T | 10210TF | 50 | A-1106 | 2.58 | 4.9 | mean: | 364 | 248 | 187 | 150 | 104 | 59 | 37 | 28 |
| | | | | | | % initial: | 15% | 3% | 1% | | | | | |
| Comp. U | SX 874B | | none | none | 0 | mean: | 544 | 493 | 433 | 379 | 326 | | | |
| | | | | | | % initial: | 67% | 46% | 34% | 28% | 19% | 11% | 7% | 5% |
| Comp. V[a] | SX 874B | 24 | A-1120 | 0.25 | 1 | mean: | 8 | | | | | | | |
| | | | | | | % initial: | 97% | 88% | 77% | 67% | 58% | | | |
| Comp. W[a] | SX 874B | 25.5 | A-1120 | 0.52 | 2 | mean: | 5 | | | | | | | |
| | | | | | | % initial: | 1% | | | | | | | |
| Comp. X[a] | SX 874B | 24.2 | A-1120 | 1.2 | 5 | mean: | 361 | 0 | | | | | | |
| | | | | | | % initial: | 0% | | | | | | | |
| Comp. Y | SX 874B | 25 | A-187 | 0.5 | 2 | mean: | 25 | | | | | | | |
| | | | A-1120 | 0.51 | 2 | % initial: | 65% | 0% | | | | | | |
| Comp. Z | SX 864B | | none | none | 0 | mean: | 12 | | | | | | | |
| | | | | | | % initial: | 5% | | | | | | | |
| Comp. AA | SX 864B | 27 | A-187 | 1.4 | 5 | mean: | 17 | | | | | | | |
| | | | | | | % initial: | 2% | | | | | | | |
| Comp. AB | SX 864B | 30.1 | A-189 | 0.38 | 1.25 | mean: | 12 | | | | | | | |
| | | | | | | % initial: | 3% | | | | | | | |
| Comp. AC | SX 864B | 30 | A-189 | 0.92 | 3 | mean: | 25 | | | | | | | |
| | | | | | | % initial: | 2% | | | | | | | |
| Comp. AD | SX 864B | 30.1 | A-189 | 1.56 | 4.9 | mean: | 22 | | | | | | | |
| | | | | | | % initial: | 5% | | | | | | | |

TABLE 1-continued

Brightness After Home Washing

| Example | Plastisol | Mass of Plastisol (grams) | Silane | Mass of Silane (grams) | Percent Silane | | 5 | 10 | 15 | 20 | 25 | 35 | 45 | 55 |
|---|---|---|---|---|---|---|---|---|---|---|---|---|---|---|
| Comp. AE | SX 864B | 20.5 | A-1100 | 0.21 | 1 | mean:<br>% initial: | 32<br>4% | | | | | | | |
| 9 | SX 864B | 22.8 | A-1100 | 0.68 | 2.9 | mean:<br>% initial: | 534<br>97% | 497<br>91% | 462<br>84% | 432<br>79% | 399<br>73% | 337<br>62% | 274<br>50% | 231<br>42% |
| 10 | SX 864B | 20.6 | A-1100 | 1 | 4.6 | mean:<br>% initial: | 553<br>100% | 525<br>95% | 513<br>93% | 491<br>89% | 471<br>86% | 436<br>79% | 387<br>70% | 342<br>62% |
| 11 | SX 864B | 20 | A-1120 | 0.2 | 1 | mean:<br>% initial: | 521<br>96% | 465<br>86% | 413<br>76% | 359<br>66% | 314<br>58% | 235<br>43% | 172<br>32% | 119<br>22% |
| 12 | SX 864B | 20.2 | A-1120 | 0.62 | 3 | mean:<br>% initial: | 556<br>102% | 531<br>97% | 523<br>96% | 505<br>93% | 486<br>89% | 457<br>84% | 411<br>76% | 386<br>71% |
| 13 | SX 864B | 26.8 | A-1120 | 1 | 4 | mean:<br>% initial: | 547<br>98% | 531<br>96% | 519<br>93% | 513<br>92% | 506<br>91% | | | |
| 14 | SX 864B | 20.2 | A-1120 | 1 | 4.7 | mean:<br>% initial: | 550<br>102% | 546<br>101% | 534<br>99% | 528<br>97% | 522<br>96% | 508<br>94% | 479<br>88% | 455<br>84% |
| Comp. AF | SX 864B | 20.1 | A-1130 | 0.21 | 1 | mean:<br>% initial: | 218<br>40% | 79<br>14% | 21<br>4% | | | | | |
| Comp. AG | SX 864B | 20.1 | A-1130 | 0.62 | 3 | mean:<br>% initial: | 286<br>53% | 127<br>23% | 52<br>10% | 29<br>5% | 15<br>3% | | | |
| Comp. AH | SX 864B | 20.2 | A-1130 | 1 | 4.7 | mean:<br>% initial: | 279<br>51% | 182<br>33% | 112<br>21% | 84<br>15% | 43<br>8% | | | |
| 15 | SX 864B | 33.1 | A-1130 | 3.35 | 9.2 | mean:<br>% initial: | 510<br>98 | 491<br>95 | 483<br>93 | | | | | |
| Comp. AI | SX 864B | 36.7 | A-1130 | 5.51 | 13 | mean:<br>% initial: | 290<br>54 | 256<br>47 | 215<br>40 | | | | | |
| Comp. AJ | SX 864B | 20 | A-1170 | 0.2 | 1 | mean:<br>% initial: | 77<br>14% | 10<br>2% | | | | | | |
| 16 | SX 864B | 20 | A-1170 | 0.61 | 3 | mean:<br>% initial: | 557<br>100% | 536<br>97% | 514<br>93% | 492<br>89% | 475<br>86% | 447<br>81% | 401<br>72% | 377<br>68% |
| 17 | SX 864B | 20 | A-1170 | 1 | 4.8 | mean:<br>% initial: | 447<br>84% | 384<br>72% | 348<br>65% | 294<br>55% | 239<br>45% | 167<br>31% | 119<br>22% | 100<br>19% |
| Comp. AK | SX 864B | 20.1 | A-1106 | 0.25 | 1.2 | mean:<br>% initial: | 15<br>3% | | | | | | | |
| Comp. AL | SX 864B | 20 | A-1106 | 0.61 | 3 | mean:<br>% initial: | 428<br>79% | 335<br>62% | 254<br>47% | 197<br>37% | 148<br>27% | 80<br>15% | 50<br>9% | 28<br>5% |
| Comp. AM | SX 864B | 21 | A-1106 | 1 | 4.5 | mean:<br>% initial: | 463<br>85% | 384<br>70% | 320<br>59% | 261<br>48% | 210<br>38% | 128<br>23% | 79<br>14% | 45<br>8% |
| Comp. AN | SX 864B | | A-1310 | | 1 | mean:<br>% initial: | 26<br>5% | | | | | | | |
| Comp. AO | SX 864B | | A-1310 | | 2 | mean:<br>% initial: | 39<br>7% | | | | | | | |
| Comp. AP | SX 864B | | A-1310 | | 3 | mean:<br>% initial: | 20<br>4% | | | | | | | |
| Comp. AQ | SX 864B | | A-1310 | | 4 | mean:<br>% initial: | 27<br>5% | | | | | | | |
| Comp. AR | SX 864B | | A-1310 | | 5 | mean:<br>% initial: | 13<br>2% | | | | | | | |
| Comp. AS | SX 864C | 17.6 | none | none | 0 | mean:<br>% initial: | 123<br>24% | 51<br>10% | 16<br>3% | | | | | |
| Comp. AT | SX 864C | 20.4 | A-1100 | 0.2 | 1 | mean:<br>% initial: | 181<br>33% | 90<br>16% | 36<br>7% | | | | | |
| 18 | SX 864C | 20.6 | A-1100 | 0.61 | 2.9 | mean:<br>% initial: | 457<br>84% | 380<br>70% | 320<br>59% | 260<br>48% | 215<br>40% | 140<br>26% | 86<br>16% | 60<br>11% |
| 19 | SX 864C | 20.2 | A-1100 | 1 | 4.7 | mean:<br>% initial: | 554<br>99% | 530<br>94% | 497<br>89% | 473<br>84% | 433<br>77% | 391<br>70% | 346<br>62% | 287<br>51% |
| 20 | SX 864C | 20 | A-1120 | 0.22 | 1.1 | mean:<br>% initial: | 511<br>93% | 454<br>83% | 412<br>75% | 364<br>66% | 334<br>61% | 270<br>49% | 214<br>39% | 167<br>30% |
| 21 | SX 864C | 20.3 | A-1120 | 0.64 | 3 | mean:<br>% initial: | 508<br>94% | 474<br>87% | 443<br>82% | 419<br>77% | 384<br>71% | 338<br>62% | 291<br>54% | 257<br>47% |
| 22 | SX 864C | 20 | A-1120 | 1 | 4.8 | mean:<br>% initial: | 505<br>91% | 464<br>84% | 435<br>79% | 403<br>73% | 384<br>69% | 334<br>60% | 300<br>54% | 262<br>47% |
| Comp. AU | SX 864C | 20 | A-1130 | 0.23 | 1 | mean:<br>% initial: | 122<br>22% | 63<br>11% | 38<br>7% | | | | | |
| Comp. AV | SX 864C | 20.2 | A-1130 | 0.63 | 3 | mean:<br>% initial: | 104<br>19% | 44<br>8% | 20<br>4% | | | | | |
| Comp. AW | SX 864C | 20 | A-1130 | 1 | 4.8 | mean:<br>% initial: | 34<br>6% | 12<br>2% | | | | | | |
| 23 | SX 864C | 20.1 | A-1170 | 0.22 | 1.1 | mean:<br>% initial: | 518<br>96% | 470<br>87% | 419<br>78% | 368<br>68% | 319<br>59% | 219<br>41% | 130<br>24% | 84<br>16% |
| 24 | SX 864C | 20 | A-1170 | 0.61 | 3 | mean:<br>% initial: | 564<br>102% | 542<br>98% | 519<br>94% | 494<br>89% | 471<br>85% | 424<br>77% | 381<br>69% | 340<br>61% |
| 25 | SX 864C | 20 | A-1170 | 1 | 4.8 | mean: | 489 | 453 | 415 | 387 | 342 | 284 | 252 | 211 |

TABLE 1-continued

Brightness After Home Washing

| Example | Plastisol | Mass of Plastisol (grams) | Silane | Mass of Silane (grams) | Percent Silane | | Number of Washings | | | | | | | |
|---|---|---|---|---|---|---|---|---|---|---|---|---|---|---|
| | | | | | | | 5 | 10 | 15 | 20 | 25 | 35 | 45 | 55 |
| Comp. AX | SX 864C | 20 | A-1106 | 0.22 | 1.1 | % initial: mean: | 88% 7 | 81% | 74% | 69% | 61% | 51% | 45% | 38% |
| Comp. AY | SX 864C | 20 | A-1106 | 0.61 | 3 | % initial: mean: | 1% 242 | 132 | 68 | 59 | 25 | 9 | | |
| | | | | | | % initial: | 45% | 24% | 13% | 11% | 5% | 2% | | |
| Comp. AZ | SX 864C | 20.6 | A-1106 | 1.03 | 4.8 | mean: | 374 | 295 | 180 | 130 | 80 | 36 | 13 | 9 |
| | | | | | | % initial: | 69% | 54% | 33% | 24% | 15% | 7% | 2% | 2% |
| Comp. BA | Union Plus 9090 | 30 | none | none | 0 | mean: % initial: | 3 0% | | | | | | | |
| Comp. BB | Union Plus 9090 | 30 | A-1100 | 0.32 | 1 | mean: % initial: | 3 0% | | | | | | | |
| Comp. BC | Union Plus 9090 | 30 | A-1100 | 0.92 | 3 | mean: | 126 | 40 | 17 | | | | | |
| | | | | | | % initial: | 23% | 7% | 3% | | | | | |
| Comp. BD | Union Plus 9090 | 30.1 | A-1100 | 1.5 | 4.9 | mean: | 487 | 411 | 362 | 320 | 222 | 153 | 106 | |
| | | | | | | % initial: | 89% | 75% | 66% | 59% | 41% | 28% | 19% | |
| Comp. BE | Union Plus 9090 | 30 | A-1120 | 0.34 | 1.1 | mean: | 22 | 5 | | | | | | |
| | | | | | | % initial: | 4% | 1% | | | | | | |
| 26 | Union Plus 9090 | 20.1 | A-1120 | 0.6 | 2.9 | mean: | 497 | 440 | 399 | 365 | 334 | 261 | 206 | 165 |
| | | | | | | % initial: | 91% | 80% | 73% | 67% | 61% | 48% | 38% | 30% |
| 27 | Union Plus 9090 | 20 | A-1120 | 1.03 | 4.9 | mean: | 539 | 516 | 501 | 484 | 466 | 429 | 385 | 369 |
| | | | | | | % initial: | 97% | 93% | 90% | 87% | 84% | 77% | 69% | 67% |
| Comp. BF | Union Plus 9090 | 20.1 | A-1130 | 0.23 | 1.1 | mean: | 24 | 7 | | | | | | |
| | | | | | | % initial: | 4% | 1% | | | | | | |
| Comp. BG | Union Plus 9090 | 20 | A-1130 | 0.63 | 3 | mean: | 226 | 172 | 136 | 111 | 91 | 67 | 50 | 52 |
| | | | | | | % initial: | 41% | 31% | 25% | 20% | 17% | 12% | 9% | 9% |
| Comp. BH | Union Plus 9090 | 20 | A-1130 | 1.02 | 4.8 | mean: | 258 | 196 | 183 | 156 | 141 | 109 | 87 | 103 |
| | | | | | | % initial: | 47% | 36% | 34% | 29% | 26% | 20% | 16% | 19% |
| Comp. BI | Union Plus 9090 | 20 | A-1170 | 0.22 | 1.1 | mean: % initial: | 3 0% | | | | | | | |
| Comp. BJ | Union Plus 9090 | 20.1 | A-1170 | 0.6 | 2.9 | mean: % initial: | 3 0% | | | | | | | |
| Comp. BK | Union Plus 9090 | 20.1 | A-1170 | 1.02 | 4.8 | mean: | 390 | 261 | 187 | 120 | 79 | 30 | | |
| | | | | | | % initial: | 72% | 48% | 35% | 22% | 15% | 5% | | |
| Comp. BL | Union Plus 9090 | 20.1 | A-1106 | 0.23 | 1 | mean: % initial: | 3 0% | | | | | | | |
| Comp. BM | Union Plus 9090 | 20 | A-1106 | 0.62 | 3 | mean: | 10 | | | | | | | |
| | | | | | | % initial: | 2% | | | | | | | |
| Comp. BN | SX 863 | 20 | none | 0 | 0 | mean: | 7 | | | | | | | |
| | | | | | | % initial: | 1% | | | | | | | |
| 28 | SX 863 | 20 | A-1100 | 0.21 | 1 | mean: | 472 | 439 | 404 | 380 | 359 | 303 | 317 | 209 |
| | | | | | | % initial: | 86% | 80% | 74% | 69% | 65% | 55% | 58% | 38% |
| 29 | SX 863 | 20 | A-1100 | 0.6 | 2.9 | mean: | 544 | 540 | 527 | 517 | 503 | 475 | 449 | 438 |
| | | | | | | % initial: | 99% | 98% | 96% | 94% | 92% | 87% | 82% | 80% |
| 30 | SX 863 | 20.1 | A-1100 | 1.04 | 4.9 | mean: | 549 | 537 | 529 | 524 | 504 | 478 | 461 | 444 |
| | | | | | | % initial: | 98% | 96% | 95% | 94% | 90% | 86% | 83% | 79% |
| 31 | SX 863 | 20 | A-1120 | 0.24 | 1.2 | mean: | 548 | 540 | 539 | 532 | 516 | 499 | 481 | 472 |
| | | | | | | % initial: | 99% | 97% | 97% | 96% | 93% | 90% | 87% | 85% |
| 32 | SX 863 | 20 | A-1120 | 0.63 | 3 | mean: | 542 | 540 | 537 | 527 | 509 | 486 | 468 | 455 |
| | | | | | | % initial: | 99% | 98% | 98% | 96% | 93% | 88% | 85% | 83% |
| 33 | SX 863 | 20 | A-1120 | 1.02 | 4.8 | mean: | 547 | 531 | 528 | 521 | 499 | 470 | 435 | 419 |
| | | | | | | % initial: | 99% | 96% | 95% | 94% | 90% | 85% | 79% | 76% |
| 34 | SX 863 | 20.1 | A-1130 | 0.21 | 1 | mean: | 506 | 491 | 404 | 365 | 318 | 256 | 188 | 135 |
| | | | | | | % initial: | 92% | 89% | 73% | 66% | 58% | 46% | 34% | 24% |
| 35 | SX 863 | 20.1 | A-1130 | 0.64 | 3.1 | mean | 453 | 380 | 341 | 308 | 261 | 195 | 129 | 84 |
| | | | | | | % initial: | 82% | 69% | 62% | 56% | 47% | 35% | 23% | 15% |
| 36 | SX 863 | 20.1 | A-1130 | 1.05 | 5 | mean: | 392 | 331 | 312 | 281 | 251 | 191 | 147 | 114 |
| | | | | | | % initial: | 71% | 60% | 57% | 51% | 46% | 35% | 27% | 21% |
| 37 | SX 863 | 20 | A-1170 | 0.26 | 1.3 | mean: | 548 | 546 | 535 | 526 | 509 | 490 | 470 | 456 |
| | | | | | | % initial: | 99% | 99% | 97% | 95% | 92% | 89% | 85% | 82% |
| 38 | SX 863 | 20 | A-1170 | 0.64 | 3.1 | mean: | 551 | 537 | 532 | 520 | 501 | 481 | 451 | 442 |
| | | | | | | % initial: | 99% | 97% | 96% | 94% | 90% | 86% | 81% | 79% |
| 39 | SX 863 | 20 | A-1170 | 1 | 5 | mean: | 534 | 539 | 527 | 523 | 504 | 487 | 473 | 465 |
| | | | | | | % initial: | 98% | 98% | 96% | 96% | 92% | 89% | 86% | 85% |

*"5X874A" and "5X874B" vinyl plastisols comprise approximately 3% and 6% carboxylated vinyl resin, respectively. It is believed that the amino group (A base) interacts with the acidic carboxyl groups as in a titration. The resulting species is expected to be an amine carboylate salt and such salts, typically being water soluble, are not expected to contribute to improved wash durability of the applique transferred to substrate.

Examples 40–41 and Comparative Examples BO–BQ

The appliques of Examples 40 and 41 were prepared as described above using 50 grams of "SX 864B" vinyl plastisol (available from Piast-O-Meric SP, Inc.) and 2.5 grams "A=1120" aminosilane (available from Osi Specialties, Inc.). The appliques were applied to a light weight 65/35 polyester/cotton blend fabric (100 g/m$^2$) and to a heavier 65/35 polyester/cotton blend utility fabric (210 g/m$^2$). The resulting samples were dry cleaned in a Bowe Model P525 dry cleaning machine (Bowe Passat Dry Cleaning and Laundry Machine Corp., Witchita Falls, Tex.) using about 90% perchloroethylene (available from Chemical Central, Dallas, Tex.), less than about 10% sorbitan monooleate (available from Sigma Chemical, St. Louis, Mo.), and less than about 10% water. The retroreflective brightness data is shown in Table 2 as a function of the number of times the samples were dry cleaned. Each entry is the average of five separate measurements. The retained brightness values increased with the number of dry cleaning operations because of the removal of organic soluble debris that typically litters the surface of the optical lens elements.

Comparative Examples BO, BP, and BQ represent appliques made according to the teachings of U.S. Pat. No. 5,344,705 (Olsen). For each, a mixture of 50.0 grams of a polyester extender base available under the trade designation "NYLOBAG NB 381," 7.50 grams of an organic solvent-based retarder available under the trade designation "NYLOBAG NB RT," and 1.10 grams of an isocyanate hardener available under the trade designation "NYLOBAG NB 386," all of which are available from Sericoi Group Limited, Westwood Road, Broadstairs, Kent CT10 2PA, UK, was stiffed until homogeneous and then printed through a 110 T mesh/inch (43 T mesh/cm) printing screen onto the aluminum surface of the vapor coated sheet material as described above. Immediately after printing, and while the image was still wet, a uniform layer of powdered hot melt transfer adhesive 571D, available from 3M Co. Personal Safety Products, St. Paul, Minn., was applied and most of the excess powdered transfer adhesive that did not adhere to the image was allowed to fall off the sheet. The resulting powdered image was allowed to stand at room temperature overnight to dry. The resultant firm image was brushed to remove any remaining granules of the powdered transfer adhesive in the nonimaged locations. The freshly brushed images were heated in a "TEXAIR" Model 30 tunnel oven with a forced air thermostat setting of 38° C., an infrared panel setting of 505° C. and set for total residence time of about 98 seconds, or enough time to cause the surface of the powdered transfer adhesive to melt. When the transfer image returned to room temperature it was placed in a Hix Model N-800 heat transfer machine with the image facing a piece of 65/35 polyester/cotton fabric (100 g/m$^2$) and heated to 160° C. For 18 seconds at 2.8 Kg./cm$^2$. When the construction returned to room temperature the carrier was removed from the construction. The samples were dry cleaned using a Speed Queen Model CD283 dry cleaning machine (Speed Queen, Ripon, Wis.) using perchloroethylene. These dry cleaning conditions were less vigorous and abrasive than the dry cleaning conditions used above. The retroreflective brightness values were measured after ten dry cleaning procedures were performed. For comparative Example BO the retroreflective brightness was 32; for Comparative Example BP it was 16; and for Comparative Example BQ it was 20. These are an average of two measurements. These results are only presented as raw data, however, they show the retroreflective brightness of these Comparative Examples was significantly deteriorated as a result of dry cleaning the appliques.

TABLE 2

Dry Cleaning Data

| Example | Fabric | | Brightness After Bowe Dry Cleaning (Number of Dry Cleaning Operations) | | | | | | | | | |
|---|---|---|---|---|---|---|---|---|---|---|---|---|
| | | | 0 | 1 | 2 | 3 | 4 | 5 | 10 | 15 | 20 | 25 |
| 40 | 65/35 Polyester/Cotton (100 g/m$^2$) | mean: | 467 | 489 | 492 | 492 | 489 | 489 | 485 | 480 | 472 | 464 |
| | | % Initial: | 100% | 103% | 104% | 104% | 103% | 103% | 102% | 101% | 100% | 99% |
| 41 | 65/35 Polyester/Cotton (100 g/m$^2$) | mean: | 447 | 482 | 480 | 486 | 477 | 483 | 478 | 473 | 468 | 464 |
| | | % Initial: | 100% | 106% | 105% | 105% | 105% | 105% | 104% | 103% | 102% | 101% |

Examples 42–43 and Comparative Examples BR–BW

These examples demonstrate that the application of an aminosilane adhesion promoter directly to the optical lens elements with a plastisol layer applied over the sminosilane layer, according to the teaching of U.S. Pat. No. 4,102,562 (Harper et al.), does not provide the desired level of retained brightness. Sheets of the vapor coated sheet material bearing aluminum metal (aluminum VC) described above in Examples 1–39 or bearing NasAlfs (dielectric VC) were used in these experiments.

For the preparation of the dielectric vapor coated sheet material, the method described in U.S. Pat. No. 3,700,305 (Bingham) and U.S. Pat. No. 4,763,985 (Bingham) was followed. Briefly, a web of paper coated on one side with low density polyethylene was covered on the polyethylene side with a monolayer of glass beads having a refractive index of 1.93 and a diameter ranging from 45–70 micrometers. These beads were embedded in the polyethylene to a depth of approximately 30–40 percent of their diameters by heating the web to 138° C. The exposed bead side of the web was vacuum vapor coated with Na$_3$AlF$_6$ (refractive index of 1.35–1.39) to form a first layer, then vacuum coated with Bi$_2$O$_3$ (refractive index of about 1.92) to form a second layer, both layers being about one-quarter wavelength in optical thickness, as determined at 5,500 Angstroms.

for Comparative Examples BS, BT, BV, and BW, a solution of 2.6 grams of "A-1120" aminosilane dissolved in 127 grams of 2-propanol was sprayed uniformly onto either the dielectric vapor coated sheet material or the aluminum vapor coated sheet material. The silane-treated sheets were oven dried at 66° C. For two minutes. Vinyl plastisol transfer adhesive compositions containing only "SX 864B" vinyl plastisol or "SX 864B" vinyl plastisol and "A-1120" aminosilane were printed through a 110 T mesh/inch (43 T mesh/cm) polyester monofilament printing screen onto the silane-treated sheet material as well as onto the untreated vapor coated sheet material. The samples were heated to the gel point in a "TEXAIR" Model 30 tunnel oven as described above with 37 second residence times. After cooling to room temperature the images were laminated to 65/35 polyester/cotton blend fabric (100 g/m²) as described above. Table 3 shows the effect of the various treatments on wash durability of constructions based on both types of vapor coated sheet material.

To test the peel force required to remove the carrier from the applique once it was laminated to a substrate, the same compositions were prepared and printed onto the vapor coated sheet materials in the image of a 4×25 cm rectangle. After lamination to the 65/35 polyester/cotton blend fabric described above, a peel test strip was cot from the construction measuring 2.5 cm×25 cm. The fabric side of the construction was adhered to a similarly sized aluminum plate with double sided adhesive tape. The assembly was inserted into a 90° peel force fixture in an Instron Model 1122 instrument, fitted with a 2.0 Kg lead cell and adjusted to operate at 30 cm/minute. The average force measured throughout the peel was recorded for five different test strips for each example, except Comparative Example BT was the average of four measurements.

TABLE 3

| Example | Vaporcoat Substrate | Spray | Transfer Adhesive Plastisol | Silane | Average Peel Force (g/inch) Peel Impressions | | Brightness (Number of Washings) | | | | | | | | |
|---|---|---|---|---|---|---|---|---|---|---|---|---|---|---|---|
| | | | | | | | 0 | 5 | 10 | 15 | 20 | 25 | 30 | 40 | 50 |
| Comp. BR | Dielectric VC | None | SX 864B alone | None | 60 - Smooth, easy, and clean peel. | Mean: % of initial: | 209 100% | 7 4% | 5 2% | | | | | | |
| Example 42 | Dielectric VC | None | SX 864B (47.6 g) | A-1120 (1.97) | 106 - Smooth, clean, easy peel leaving sharp edged image. | Mean: % of initial: | 163 100% | 171 105% | 159 97% | 129 79% | 110 68% | 92 57% | 78 48% | 60 37% | 42 26% |
| Comp. BS | Dielectric VC | A-1120 | SX 864B alone | None | 462 - Hard to peel. Small areas of delamination in liner. | Mean: % of initial: | 143 100% | 89 62% | 49 34% | 24 17% | 12 8% | 20 14% | 12 8% | 9 6% | 7 5% |
| Comp. BT | Dielectric VC | A-1120 | SX 864B (47.6 g) | A-1120 (1.97) | 371 - Very hard to peel. Large areas of delamination in the image. | Mean: % of initial: | 191 100% | 176 92% | 150 79% | 104 54% | 82 43% | 61 32% | 49 26% | 42 22% | 34 18% |
| Comp. BU | Aluminum VC | None | SX 864B alone | None | 36 - Very smooth, clean, very easy peel leaving uniform image. Dirty stripping. | Mean: % of initial: | 544 100% | 51 9% | 28 5% | 15 3% | 9 2% | 5 1% | | | |
| Example 43 | Aluminum VC | None | SX 864B (47.6 g) | A-1120 (1.97 g) | 367 - Very smooth, clean, and easy peel leaving image with sharp edges. | Mean: % of initial: | 557 100% | 539 97% | 533 96% | 527 95% | 523 94% | 517 93% | 509 91% | 508 91% | 492 88% |
| Comp. BV | Aluminum VC | A-1120 | SX 864B only | none | 1303 - Very hard to peel. Large peel force needed. Large portion of image stayed on liner with no transfer. | Mean: % of initial: | 558 100% | 438 79% | 352 63% | 264 47% | 175 31% | 116 21% | 88 16% | 63 11% | 28 5% |
| Comp. BW | Aluminum VC | A-1120 | SX 864B (47.6 g) | A-1120 (1.97 g) | 1347 - Hard to peel. Not smooth, left large portions of image untransferred. Large mud cracks in image. | Mean: % of initial: | 585 100% | 538 92% | 521 89% | 494 84% | 475 81% | 464 79% | 441 75% | 431 74% | 391 67% |

In summary, Comparative Example BR shows the low wash durability observed when no aminosilane is applied to either the vapor coated sheet material or to the transfer adhesive composition. Example 42 used untreated dielectric vapor coated sheet material with an aminosilane-containing transfer adhesive composition according to the present invention, and the improvement in wash durability was dramatic. Comparative Example BS used the aminosilane and the vinyl plastisol of Example 42, but applied in the manner taught by U.S. Pat. No. 4,102,562 (Harper et al.) wherein the dielectric vapor coated sheet material is initially coated with the aminosilane and then coated with the vinyl plastisol without an aminosilane mixed therein. Comparative Example BS showed improvement in brightness retention when compared to Comparative Example BR, but it is clearly inferior to Example 42. Furthermore, for Comparative Example BS, the carrier was difficult to remove after lamination. It required more force and often resulted in delamination and a damaged applique. Also, although Comparative Example BT, which included aminosilane mixed with the vinyl plastisol in the transfer adhesive layer as well as a layer of the aminosilane on the vapor coated sheet material, showed improvement in brightness retention when compared to Comparative Example BS, the carrier was even more difficult to remove. When the experiments were repeated using aluminum vapor coated sheet material, similar, but more dramatic, results were obtained. For the transfer sheet having both an aminosilane coated on the vapor coated sheet material and mixed with the plastisol in the transfer adhesive layer, the carrier was difficult to remove and resulted in an unacceptable image transfer.

Examples 44–48 and Comparative Example BX

Transfer adhesive compositions were prepared using the components listed in Table 5 (Comparative Example BX was prepared as described above for Comparative Examples BO, BP, BQ). Appliques were prepared by printing these compositions through a 110 T mesh/inch (43 T mesh/cm), onto aluminum vapor coated sheet material described above in Examples 1–39, in the image of 4 cm×25 cm rectangle. The wet images were gelled with a "TEXAIR" Model 30 tunnel oven as described above, then laminated to 65/35 polyester/cotton fabric (100 g/m$^2$) as described above. Before peeling the carrier from these constructions, a 2.5 cm×25 cm piece was cut from the rectangles. From the resulting pieces were cut the required number of test pieces, each measuring 2.5 cm×5.0 cm. Stiffness was measured according to Method 5202, federal Test Method Standard No. 191A. The results are reported as the mean bending moment at 60° deflection for the listed number of measurements made (n).

TABLE 5

| Example | Plastisol | Plastisol Mass (g) | Aminosilane Mass (g) | Moment Weight (lb) | n | Bending Moment (Max) N · m |
|---------|-----------|--------------------|-----------------------|---------------------|---|-----------------------------|
| 44 | SX 874A | 103 | 5.1 | 0.02 | 7 | 4.8 × 10$^{-4}$ |
| 45 | 10210TF | 89.6 | 4.48 | 0.02 | 7 | 7.1 × 10$^{-4}$ |
| 46 | SX 874B | 88.2 | 4.55 | 0.02 | 7 | 3.9 × 10$^{-4}$ |
| 47 | SX 864B | 177 | 7.38 | 0.005 | 7 | 4.3 × 10$^{-4}$ |
| 48 | SX 863 | 80.0 | 4.00 | 0.005 | 7 | 2.8 × 10$^{-4}$ |
| Comp. BX | | | | 0.075 | 9 | 2.9 × 10$^{-3}$ |

Examples 49–56 and Comparative Examples BY–CD

These examples demonstrate how to prepare colored appliques which are colored under diffuse illumination and are retroreflectivity white. Dielectric vapor coated sheet material was prepared as described in Examples 42–43.

A suitable quantity of transfer adhesive composition to print the desired number of images was prepared by thoroughly mixing the components for the desired color selected from Table 6. Each of these colored plastosois was obtained under the trade designation "SX 864B" from Plast-O-Meric SP Inc. When homogeneous, the corresponding quantity of "A-1120" aminosilane was added and the resulting mixture was again stirred until homogeneous. The mixture was printed through an 110 T mesh/inch (43 T mesh/cm) polyester monofilament printing screen directly onto the vapor coated side of the carrier that contained a transparent, dielectric mirror prepared as described above. Immediately after priming, the support sheet with the image on the dielectric mirror surface was heated in a "TEXAIR" Model 30 tunnel oven with infrared panel set to 594° C. and forced air thermostat set to the off position, and belt speed set to allow 37 seconds total internal residence time, to cause gelation of the image. When the transfer sheets returned to room temperature they were placed with the image against the desired fabric and the whole was heat laminated to 65/35 polyester/cotton (100 g/m$^2$) with a Hix Model N-800 heat lamination machine set at 174° C. For 20 seconds at 2.8 Kg/cm$^2$. After heat lamination the construction was allowed to return to room temperature and then the support sheet was removed from the construction leaving the retroreflective image attached to the fabric substrate. The fabric bearing the substrate was laundered according to the example described above. Retroreflective brilliance was measured according to ASTM E 810-93b as a function of number of home launderings and the results are shown in Table 6. Data for similar constructions that do not contain an aminosilane are also shown in Table 6 and illustrate the effect on wash durability of this component. All data in Table 6 is the average of three separate measurements.

TABLE 6

| | SX 864B | Color | A-1120 | A-1120 | Brightness (Number of Washings) | | | | | | | |
|---|---|---|---|---|---|---|---|---|---|---|---|---|
| Example | Color | Mass (g) | Mass (g) | % of solids | | 0 | 5 | 10 | 15 | 20 | 30 | 40 | 50 |
| Comp. BY | magenta yellow | 34.2 7.66 | 0 | 0 | Means: % of 100% | 202 | 5 2% | 3 1% | | | | | |
| 49 | magenta yellow | 27.8 6.24 | 1.74 | 5.1 | Means: % of 100% | 193 | 185 96% | 161 84% | 129 67% | 105 54% | 66 34% | 42 22% | 27 14% |
| Comp. BZ | yellow | 28.6 | 0 | 0 | Means: % of 100% | 208 | 5 2% | | | | | | |
| 50 | yellow | 21.3 | 1.1 | 5.2 | Means: % of 100% | 190 | 184 96% | 176 92% | 147 77% | 122 64% | 79 41% | 52 27% | 32 17% |
| Comp. CA | black | | 0 | 0 | Means: % of 100% | 204 | 5 2% | | | | | | |
| 51 | black | 23.2 | 1.2 | 5.2 | Means: % of 100% | 193 | 172 89% | 153 79% | 127 66% | 103 53% | 65 34% | 40 21% | 27 15% |
| Comp. CB | cyan yellow | 29.7 7.7 | 0 | 0 | Means: % of 100% | 207 | 5 2% | | | | | | |
| 52 | cyan yellow | 23.4 6.1 | 1.48 | 5 | Means: % of 100% | 182 | 174 95% | 170 93% | 144 79% | 120 66% | 78 43% | 50 28% | 35 19% |
| 53 | strong cyan strong yellow | 23.5 6.1 | 1.52 | 5.1 | Means: % of 100% | 183 | 174 95% | 171 93% | 122 78% | 124 68% | 80 44% | 54 30% | 36 20% |
| Comp. CC | cyan | | 0 | 0 | Means: % of 100% | 209 | 6 3% | | | | | | |
| 54 | cyan | 22.9 | 1.1 | 4.8 | Means: | 192 | 190 | 178 | 145 | 117 | 75 | 46 | 30 |

TABLE 6-continued

| Example | SX 864B Color | Color Mass (g) | A-1120 Mass (g) | A-1120 % of solids | | Brightness (Number of Washings) | | | | | | |
|---|---|---|---|---|---|---|---|---|---|---|---|---|
| | | | | | | 0 | 5 | 10 | 15 | 20 | 30 | 40 | 50 |
| 55 | strong cyan | 21.4 | 1.1 | 5.1 | Means: | 184 | 189 | 186 | 157 | 128 | 84 | 54 | 34 |
| | | | | | % of | 100% | 103% | 101% | 85% | 70% | 46% | 29% | 19% |
| Comp. CD | Fluorescent yellow | | 0 | 0 | Means: | 207 | 5 | | | | | | |
| | | | | | % of | 100% | 3% | | | | | | |
| 56 | Fluorescent yellow | 31.9 | 1.59 | 5 | Means: | 190 | 187 | 187 | 162 | 142 | 99 | | 49 |
| | | | | | % of | 100% | 99% | 99% | 85% | 75% | 52% | | 26% |

Note: Row 55 first data line shows "% of 100% 99% 93% 75% 61% 39% 24% 16%" above Means line.

Example 57

To 44.7 g of "SX 864B" vinyl plastisol was added 2.24 g of "A-1120" aminosilane and the resulting mixture was stirred until homogeneous. The mixture was knife coated onto the aluminum surface of the substrate described in Examples 1–39. The freshly coated carrier material was passed through a tunnel oven set to cause gelation of the coated material. When the coated construction reached room temperature it was arranged with the coated side against a fabric substrate and the whole was laminated with a Hix Model N-800 laminator at about 174° C. for about 20 seconds and at about 2.8 Kg/cm². When the laminated construction reached room temperature the carrier material was removed leaving retroreflective goods without image.

The complete disclosures of all patents, patent documents, and publications cited herein are incorporated by reference, as if individually incorporated. Various modifications and alterations may be made to the invention without departing from its spirit and scope. Accordingly, it is to be understood that the invention is not to be limited to the above-described, but is to be controlled by the limitations set forth in the following claims and any equivalents thereof. It is also to be understood that the invention may be suitably practiced in the absence of any element not specifically disclosed herein.

What is claimed is:

1. A retroreflective applique comprising a layer of optical lens elements partially embedded in and protruding from a transfer adhesive layer prepared from ingredients comprising a vinyl plastisol and a substantially nonhydrolyzed aminosilane adhesion promoter; wherein the aminosilane adhesion promoter is used in an amount effective to produce an applique capable of:
   (a) retaining at least about 60% of its initial retroreflectivity after being laminated to 65/35 polyester/cotton blend fabric (100 g/m²) at about 174° C. and about 2.8 Kg/cm² pressure for about 20 seconds and subjected to home laundering conditions five times; and
   (b) retaining at least about 40% of its initial retroreflectivity after being laminated to 65/35 polyester/cotton blend fabric (100 g/m²) at about 174° C. and about 2.8 Kg/cm² pressure for about 20 seconds and subjected to home laundering conditions twenty-five times.

2. The retroreflective applique of claim 1 wherein the vinyl plastisol comprises a vinyl resin made from vinyl chloride monomers.

3. The retroreflective applique of claim 2 wherein the vinyl resin comprises a copolymer made from monomers selected from the group consisting of vinyl chloride, vinyl acetate, vinyl ether, and mixtures thereof.

4. The retroreflective applique of claim 1 wherein the aminosilane adhesion promoter is selected from the group consisting of γ-aminopropyltriethoxysilane, N-β-(aminoethyl)-γ-aminopropyltrimethoxysilane, bis-trimethoxysilylpropyl amine, and $H_2NCH_2CH_2NHCH_2CH_2NHCH_2CH_2CH_2Si(OCH_3)_3$.

5. The retroreflective applique of claim 1 wherein the optical lens elements are coated with a specular reflective material on the surface embedded in the transfer adhesive layer.

6. The retroreflective applique of claim 5 wherein the specular reflective material comprises a specular reflective metal.

7. The retroreflective applique of claim 5 wherein the specular reflective material comprises a dielectric mirror.

8. The retroreflective applique of claim 7 wherein the transfer adhesive layer includes a colorant.

9. The retroreflective applique of claim 1 further including reflective flakes distributed throughout the transfer adhesive layer.

10. The retroreflective applique of claim 9 further including a colorant in the transfer adhesive layer.

11. The retroreflective applique of claim 1 applied to a substrate.

12. The retroreflective applique of claim 11 wherein the substrate is a fabric substrate.

13. The retroreflective applique of claim 11 wherein the substrate is an article of clothing.

14. The retroreflective applique of claim 1 wherein the aminosilane adhesion promoter is used in an amount to produce an applique that is capable of retaining at least about 90% of its initial retroreflectivity after being laminated to 65/35 polyester/cotton blend fabric (100 g/m²) at about 174° C. and about 2.8 Kg/cm² pressure for about 20 seconds and subjected to home laundering conditions five times.

15. A retroreflective applique transfer sheet comprising the retroreflective applique of claim 1 and a carrier comprising a layer of a heat-softenable material; wherein the layer of optical lens elements is partially embedded in the heat-softenable material.

16. The retroreflective applique transfer sheet of claim 15 wherein the transfer adhesive layer is disposed on the optical lens elements in an imagewise fashion.

17. The retroreflective applique transfer sheet of claim 15 wherein the aminosilane adhesion promoter is selected from the group consisting of γ-aminopropyltriethoxysilane, N-β-(aminoethyl)-γ-aminopropyltrimethoxysilane, bis-trimethoxysilylpropyl amine, and $H_2NCH_2CH_2NHCH_2CH_2NHCH_2CH_2CH_2Si(OCH_3)_3$.

18. The retroreflective applique transfer sheet of claim 17 wherein the vinyl plastisol comprises a vinyl resin made from vinyl chloride monomers.

19. The retroreflective applique transfer sheet of claim 18 wherein the vinyl resin comprises a copolymer made from monomers selected from the group consisting of vinyl chloride, vinyl acetate, vinyl ether, and mixtures thereof.

20. The retroreflective applique transfer sheet of claim 15 further including reflective flakes and a colorant distributed throughout the transfer adhesive layer.

\* \* \* \* \*